(12) United States Patent
Lund et al.

(10) Patent No.: US 6,804,417 B1
(45) Date of Patent: Oct. 12, 2004

(54) PIXEL DEPLETION TECHNIQUE

(75) Inventors: Mark D. Lund, Vancouver, WA (US); Thomas B. Pritchard, Brush Prairie, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/539,546

(22) Filed: Mar. 31, 2000

(51) Int. Cl.$^7$ ............................................. G06K 9/32
(52) U.S. Cl. ........................ 382/299; 382/254; 382/269
(58) Field of Search ................................ 382/299, 269, 382/266, 258, 254; 358/1.2

(56) References Cited

U.S. PATENT DOCUMENTS

| | | |
|---|---|---|
| 3,573,789 A | 4/1971 | Sharp et al. |
| 4,122,496 A | 10/1978 | Childress et al. |
| 4,130,841 A | 12/1978 | Walsh et al. |
| 4,437,122 A | 3/1984 | Walsh et al. |
| 4,672,432 A | 6/1987 | Sakurada et al. |
| 5,044,796 A | 9/1991 | Lund |
| 5,270,728 A | 12/1993 | Lund et al. |
| 5,516,216 A | 5/1996 | McDonough et al. |
| 5,563,721 A | 10/1996 | Overton |
| 5,650,858 A * | 7/1997 | Lund ......................... 382/254 |
| 5,652,660 A * | 7/1997 | Seto et al. .................. 382/254 |
| 5,706,414 A | 1/1998 | Pritchard |

FOREIGN PATENT DOCUMENTS

GB 2334124 A * 8/1999 ............ B41J/2/485

* cited by examiner

*Primary Examiner*—Thomas D. Lee

(57) ABSTRACT

Multiple algorithms are applied to expand input image data of a variety of lower resolutions to output image data of a variety of higher resolutions with enhanced text quality, particularly in the black datapath controlling an output device such as an inkjet or laser printer. Enhancement techniques include edge smoothing, bit stripping for large drop weight pens, and drop-weight based ink depletion. Embodiments provide algorithms that convert 600×600 dpi input resolution data to 1200×600 dpi output resolution image data or 300×300 to 600×300 dpi resolution (i.e., asymmetric 2:1 ratio resolution conversion along mutually perpendicular axes), including text edge smoothing, while causing minimal change to gray scaled (halftoned) data within images. The techniques can be applied to other resolutions as well. Some embodiments include unidirectional bitstripping that preserves 1200 dpi edges while applying output pixels at only 600 dpi from 1200 dpi resolution output image data. Some embodiments include drop-weight based depletion to adjust the average ink flux to 32 ng per 1/600th inch cell, thereby preventing excess ink application at high output resolutions, e.g., 1200×600 dpi. In various embodiments, operations are performed in hardware modules and/or performed cooperatively as an integrated process to meet system throughput requirements.

23 Claims, 14 Drawing Sheets

PIXEL DEPLETION TECHNIQUE

CROSS REFERENCE TO RELATED APPLICATIONS

This application is related to U.S. patent application Ser. No. 09/041,408, entitled "Method and Apparatus for Determining an Optimum Print Density for an Ink Jet Printer," by Castle et al., filed Mar. 12, 1998, and commonly assigned, the specification of which is incorporated herein by reference in its entirety.

FIELD OF THE INVENTION

This invention relates to a method and system for depleting pixels, such as for adjusting an amount of ink to be deposited on a medium by an inkjet printer.

BACKGROUND

There is a large installed base of inkjet and laser printers having substantially equal vertical and horizontal resolutions of 300 dots per inch (dpi). Recently, higher resolution printers are providing superior print quality due to their ability to produce 600 dpi or higher resolution images. It would unduly burden the host computer that drives the higher resolution printers to require that it create 600 dpi pixel or higher resolution output data from 300 dpi documents, applications or image databases produced thereby. Not only would this require large amounts of memory in the host, but it also would reduce 600 dpi-printer throughput or increase host processing time. It is desirable to take advantage of the advent of higher resolution printers in many print applications without paying a significant throughput penalty.

In order to preserve compatibility with lower resolution applications and databases, to take advantage of the higher resolution printers, and to maintain high throughput, it is desirable to perform any needed pixel image data processing at the destination printer rather than at the source computer. Thus, smart printer controllers that are capable of receiving 300 dpi image data from the computer may be used to drive either 300 dpi resolution printers (without conversion overhead) or 600 dpi (or higher) resolution printers (with minimal conversion overhead) to produce respectively lower and higher quality print results. Although a brute-force increase in the fundamental grid resolution does improve print quality, the improvement is not realized in a cost effective manner. Additionally, simply scaling the image resolution, e.g., from 300 dpi to 600 dpi, leaves undesirable jagged edges on text. These jagged edges are particularly objectionable in black-only print applications and in a black image datapath of a multicolor, e.g., cyan-magenta-black-yellow-black (CMYK), print application.

A method of pattern matching of a lower resolution image to generate a higher resolution image is described in U.S. Pat. No. 3,573,789, by Sharp et al., issued Apr. 6, 1971. U.S. Pat. No. 4,437,122 by Walsh, issued Mar. 13, 1984, describes a software implementation. U.S. Pat. No. 5,650,858 by Lund, issued Jul. 22, 1997, incorporated herein by reference in its entirety, describes hardware implementation systems that preserve gray scaled graphic images. These implementations are referred to collectively herein as TES, an acronym for "Thermal Inkjet Edge Smoothing."

As described in Lund, cited above, TES is performed, e.g., in printer hardware, firmware, or software, by mapping m×n dot matrix input data into m'×n' dot matrix output data (where m' is an integer multiple of m, where n' is an integer multiple of n, and where at least one of m' and n' is greater than one) and processing the output data to effect edge smoothing via stored smoothing criteria, both the mapping and the processing being accomplished without affecting any gray scale patterns As an example, assume m and n=300 dots per inch (defining a 300 dpi by 300 dpi input pixel image), and it is desired to print a 600 dpi by 600 dpi output pixel image. The method and system are applicable generally where m and n may be the same or different and where the integer resolution multipliers may be any positive integers (at least one of which is greater than one, in order to accomplish resolution multiplication).

The 300 dpi source data is converted to 600 dpi and enhanced. Lund's TES system consists of a logic circuit performing rule logic equations. These equations define how individual 600 dpi dots are changed, if appropriate, from the 300 dpi source image. More specifically, for every dot in the 300 dpi source image, a window is created to look at its surrounding 80 neighbors in a 9×9 cell. Each input dot is replaced by a 2×2 dot pattern, effectively generating a 600 dpi image. Based on the binary signals defining the dot pattern, the logic circuit modifies the 2×2 superpixel to remove jagged edges. Lund, cited above, describes algorithms for the implementation of TES formulated as boolean logic equations, flow diagrams, graphic templates, and hardware circuits.

Lund's TES works by scaling image input data, smoothing by adding and deleting dots, then outputting to a printing device. Scaling is typically performed by special hardware in the printer just before printing. No extra resolution is required in the application, data communications, or printer input buffer, but better quality output is produced. TES adjusts only dot placement, but not dot size. It can move dots on a grid finer than the input pixel resolution, and can add or remove dots as required. TES smoothes edges by reducing the step size and increasing the number of steps of ragged line edges. It preserves stroke weights of text and causes minimal changes to dithered halftone images.

Halftone images are created, in one example, by using a variable size pixel at a lower resolution. Importantly, TES does not change the density of these halftone dots. If it is determined that the target pixel is part of a halftoned image, the corresponding superpixel produced at the output for printing preserves the gray scale within the original lower resolution input pixel image without smoothing.

MultiLevel Printing (hereinafter designated as MLP) is a technology that improves color print quality not by increasing dots-per-inch but by reducing the ink drop size to place more dots in a 1/300th inch pixel. This increases the number of color levels per pixel, yielding better color print quality without the data overhead of moving to a higher printer resolution. Whereas a binary pixel has two density levels ON or OFF only, a MLP pixel has more than two levels, for example four density levels (two bits) such as OFF, LIGHT, MEDIUM, DARK. This reduces the time needed to print the document and the need for more powerful and costly hardware. It basically halves the ink drop volume, requiring two passes of a print head to fully saturate a given 1/300th inch pixel. Typically this does not result in a throughput penalty, since normal color printing modes typically already require two passes. The basic principles underlying MLP are described in U.S. Pat. No. 4,672,432 by Sakurada et al., issued Jun. 9, 1987, incorporated herein by reference in its entirety.

MLP provides better color matching, more uniform area fills, lighter secondary colors, better dithering in half-tones, more flexibility in ink dye balance, and a smaller amount of input data when compared to binary data. Using half the ink drop volume enables a printer to deliver 0–3 drops of each ink color per pixel in a normal paper mode, allowing 64 three-color shades per pixel, compared to 8 color shades for binary three-color printing. This enables the printer to halftone with approximately 64 shades instead of 8.

300 dpi MLP input data are typically used in instances where throughput is more important than achieving maximum print quality. The smaller drop volume provides similar detail with less granularity than binary 600 dpi. Even higher resolution detail is supported through 600 dpi MLP data.

In inkjet printing, conventional print heads deliver black ink drops having a weight of, for example, approximately 32 ng (nanograms). This drop size is appropriate to fill a single 600×600 dpi dot. However, at a 1200×600 dpi drop density, 32 ng ink drops apply twice as much ink as is required for a dot. It is desirable, therefore, to reduce the average delivered ink drop weight for some output image resolutions. The basic principles of a technology for this purpose, known as "bitstripping," are described in U.S. Pat. No. 5,270,728 by M. D. Lund and S. O. Miller, issued Dec. 14, 1993, incorporated herein by reference in its entirety. Some print heads deliver 16 ng or smaller ink drops, so do not deliver excess ink at 1200×600 dpi density and thus do not require bitstripping.

Another method for reducing the volume of ink applied to high-density print regions involves selectively depleting the ink delivered to certain pixels in these regions. The basic principles of this "depletion" technology are described in U.S. Pat. No. 5,706,414 by Pritchard, issued Jan. 6, 1998, incorporated herein by reference in its entirety.

It is desirable in the art to provide an improved method and system for depleting pixels. It is also desirable to provide a method and system for converting digital input image data of a variety of resolutions to output image data of a variety of higher resolutions, while simultaneously preserving gray scaling and smoothing text edges. It is further desirable to perform these operations at an output device, preferably in hardware, such that the image data throughput of the system is maximized.

SUMMARY

Multiple algorithms are applied to expand input image data of a variety of lower resolutions to output image data of a variety of higher resolutions with enhanced text quality, particularly in the black datapath controlling an output device such as an inkjet or laser printer. Enhanced performance for 600×600 or 1200×600 dots per inch (dpi) output resolution is provided for a variety of input data resolutions, including 300×300, 600×600, and 1200×600 dpi. The techniques described herein apply to other resolutions as well.

Enhancement techniques include edge smoothing, bit stripping for large drop weight pens, and drop-weight based ink depletion. Embodiments of the various techniques can incorporate the prior bitstripping, depletion, TES, and MLP technologies (see M. D. Lund and S. O. Miller, U.S. Pat. No. 5,270,728; Pritchard, U.S. Pat. No. 5,706,414; Lund, U.S. Pat. No. 5,650,858; and Sakurada et al., U.S. Pat. No. 4,672,432, cited above) to convert 300×300 dpi input resolution image data to 600×600 dpi output resolution image data (i.e., symmetric resolution doubling). Embodiments of the techniques provide algorithms that convert 600×600 dpi input resolution data to 1200×600 dpi output resolution image data or 300×300 to 600×300 dpi resolution (i.e., asymmetric 2:1 ratio resolution conversion along mutually perpendicular axes), including text edge smoothing, while causing minimal change to halftoned data within images.

Each pixel has an associated pixel density, and the input pixel data can have an associated gray scale of densities, which can be simple binary levels (e.g., ON, OFF) or multibit gray scale levels, such as two bit levels OFF, LIGHT, MEDIUM, DARK. In accordance with an embodiment of the invention, a resolution expansion method includes: selecting a given pixel of an input pixel image and defining a window that includes the given pixel and a set of immediately neighboring pixels; determining whether any pixel within the window contains gray scale density data; if so, then expanding the resolution of the given pixel within the defined window to produce a gray scaled output pixel image at the expanded resolution; if not, then mapping the given pixel into a predefined plural-pixel of the expanded resolution by performing logical equations on the binary pattern within the defined window and, based on the results of the logic equations, substituting for the given pixel an expanded resolution predefined plural-pixel. This produces an output plural-pixel of expanded resolution, while preserving any gray scale of the given input pixel. In some embodiments, this expansion method is applied to produce output image data of asymmetric resolution from input image data of symmetric resolution.

A method of depleting the pixel density of a selected output pixel involves comparing logically with predetermined selection criteria, including: alignment of the selected output pixel with a preselected position in a two-dimensional depletion array tiled logically across the image plane; and determining that the selected output pixel and its four neighboring output pixels have a preselected pixel density. In some embodiments, the preselected pixel density is DARK. In some embodiments, if the selected output pixel has a gray scale level, its pixel density is depleted by reducing its gray scale density level. In asymmetric resolutions, the selected output pixel and four neighboring output pixels are all contained within a corresponding selected input pixel and three input pixels immediately adjacent the selected input pixel.

Depletion (pixel thinning) reduces by approximately a factor of two the average pixel density of an output pixel image, which would otherwise deliver excessive ink to a printer. A pixel thinning method includes: scanning a first row of given pixels of an output pixel image; determining if the first row contains a series of consecutive pixels having dark pixel density; if so, then turning off alternate dark density pixels in the series, reducing the pixel density on average by approximately one-half; scanning the next row of given pixels; and selectively turning on pixels within the series, thereby preserving edge definition and filling preselected interior spaces within dark pixel density images.

Some embodiments include unidirectional bitstripping that preserves 1200 dpi edges while applying output pixels at only 600 dpi from 1200 dpi resolution output image data. Some embodiments include drop-weight based depletion to adjust the average ink flux to 32 ng per ⅙₀₀th inch cell, thereby preventing excess ink application at high output resolutions, e.g., 1200×600 dpi. In various embodiments, the above operations are performed in hardware modules and/or performed cooperatively as an integrated process to meet system throughput requirements. Some embodiments provide a plurality of substantially identical processing modules configured to process multiple given pixels substantially concurrently.

The present invention is better understood upon consideration of the detailed description below, in conjunction with the accompanying drawings.

BRIEF DESCRIPTION OF THE DRAWINGS

The present invention may be better understood, and its numerous objects, features, and advantages made apparent to those skilled in the art by referencing the accompanying drawings. For simplicity and ease of understanding, common numbering of elements within the illustrations is employed where an element is the same in different drawings.

DETAILED DESCRIPTION OF THE EMBODIMENTS

The following is a detailed description of illustrative embodiments of the present invention. As these embodiments of the present invention are described with reference to the aforementioned drawings, various modifications or adaptations of the methods and or specific structures described may become apparent. These descriptions and drawings are not to be considered in a limiting sense as it is understood that the present invention is in no way limited to the embodiments illustrated.

SYSTEM OVERVIEW

Figure 1:
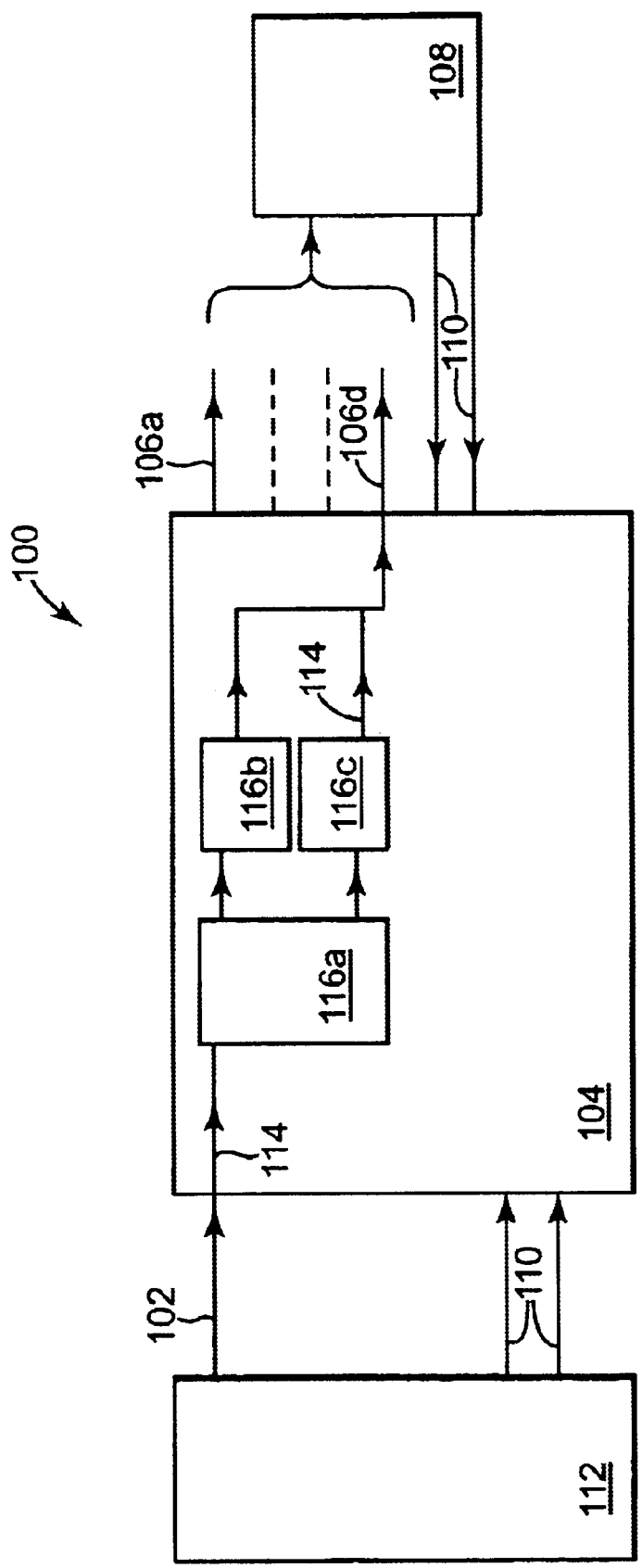
FIG. 1 is a block diagram showing a conceptual overview of a system for print image resolution expansion.

FIG. 1 is a block diagram showing a conceptual overview of a system 100 for print image resolution expansion. Input pixel image data 102 enters a processor 104. Input pixel image data 102 is typically a bitstream produced by conventional techniques and is formatted in any of a variety of conventional image resolutions, as described below in more detail. Processor 104 applies algorithms that process and convert input pixel image data 102 into output pixel image data, e.g., 106a–106d, having an output resolution and format preselected at processor 104 to match the capabilities and requirements of a destination output device 108. Processor 104 is preferably located at or proximate to an output device 108, typically a laser printer or inkjet printer.

A datapath, illustratively datapath 114, within processor 104 interconnects a particular input pixel image data format, e.g., 300 dpi binary, with a particular output pixel image data format, e.g., 600 dpi. This is further discussed with respect to FIG. 2A. In each such datapath, the input pixel image data is processed by an algorithm or multiple algorithms configured in series and/or parallel, illustratively algorithms 116a–116c. In various embodiments, such algorithms are implemented in hardware, firmware, and/or software. A microprocessor would carry out the software program. In some hardware implementations, the role of processor 104 is performed by an ASIC device or a logic array. In principle, all possible datapaths interconnecting all possible pairs of input and output formats can be incorporated into processor 104. However, some practical implementations incorporate only a single datapath or a limited subset of all possible datapaths, as required by specific output devices and/or input data formats. Datapath selection, including input and output resolution and formatting, is provided to processor 104 by control signals through external signal lines 110 from a host controller 112 and/or from output device 108. Alternatively, such control signals are derived from the bitstream of input pixel image data 102.

Although examples described below typically refer to black (K) image datapaths, the principles of the invention are generally applicable to any color datapath of a monochrome or multicolor, e.g., CMYK, output implementation.

BLACK 300×300 DATAPATH INPUTS

Figure 2A:
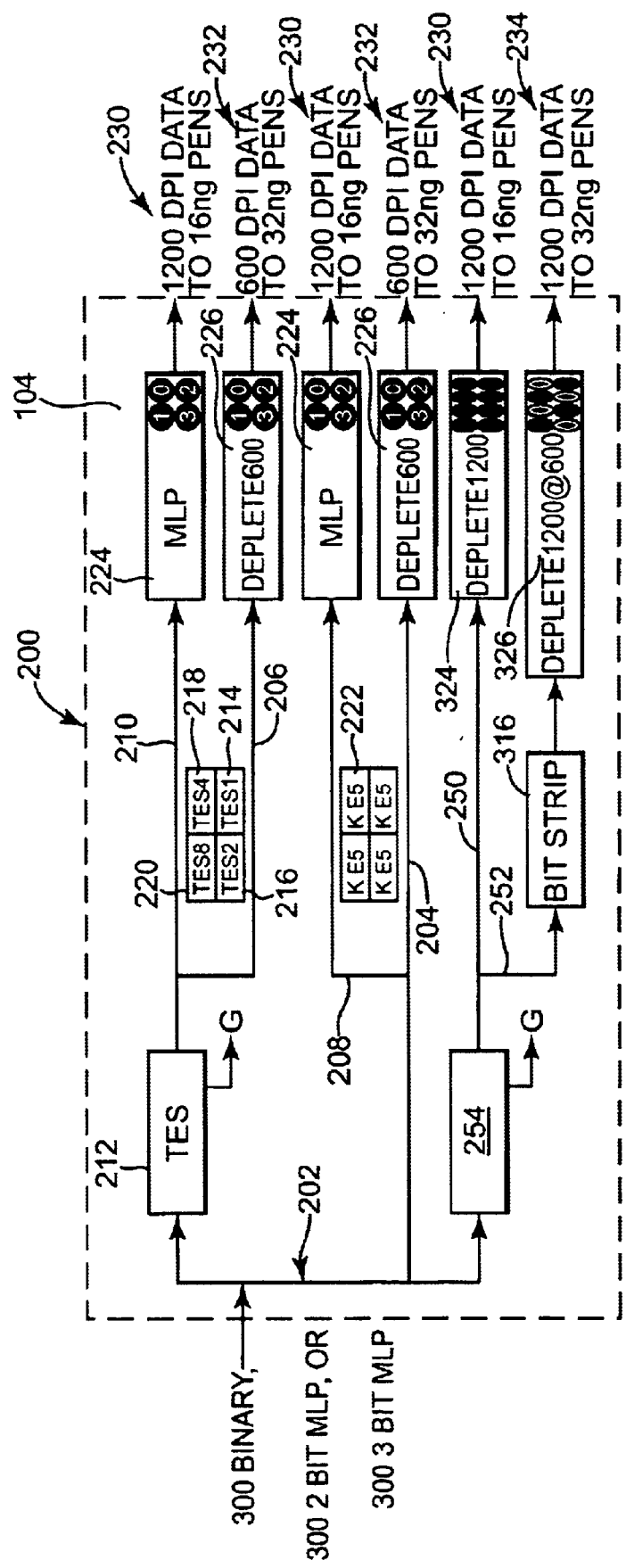
FIG. 2A is a flow diagram of exemplary black datapaths having 300×300 dpi input pixel image data.

FIG. 2A is a flow diagram 200 of various exemplary black datapaths having 300×300 dpi input pixel image data 202. Input pixel image data 202 can be, for example, 300×300 dpi binary (OFF, ON levels only), 300×300 dpi 2 bit MLP (OFF, LIGHT, MEDIUM, DARK density levels), or 300×300 dpi 3 bit MLP (eight density levels). MLP formats are described below in more detail. In datapaths 208 and 210, input pixel data 202 is converted to 1200 dpi output data 230 driving 16 ng inkjet pens as output devices. Datapaths 206 and 210 include a TES algorithm 212, fully described in Lund (U.S. Pat. No. 5,650,858), cited above. An image data pattern including each central input pixel and its neighboring pixels are used to generate an output 2×2 superpixel at twice the horizontal and vertical resolution. If it is determined that there are gray-scaled pixels within the neighborhood surrounding and including a central pixel of the input pixel image, the corresponding superpixel is simply a replicated version of the input pixel value.

TES

Figures 2B, 2C:
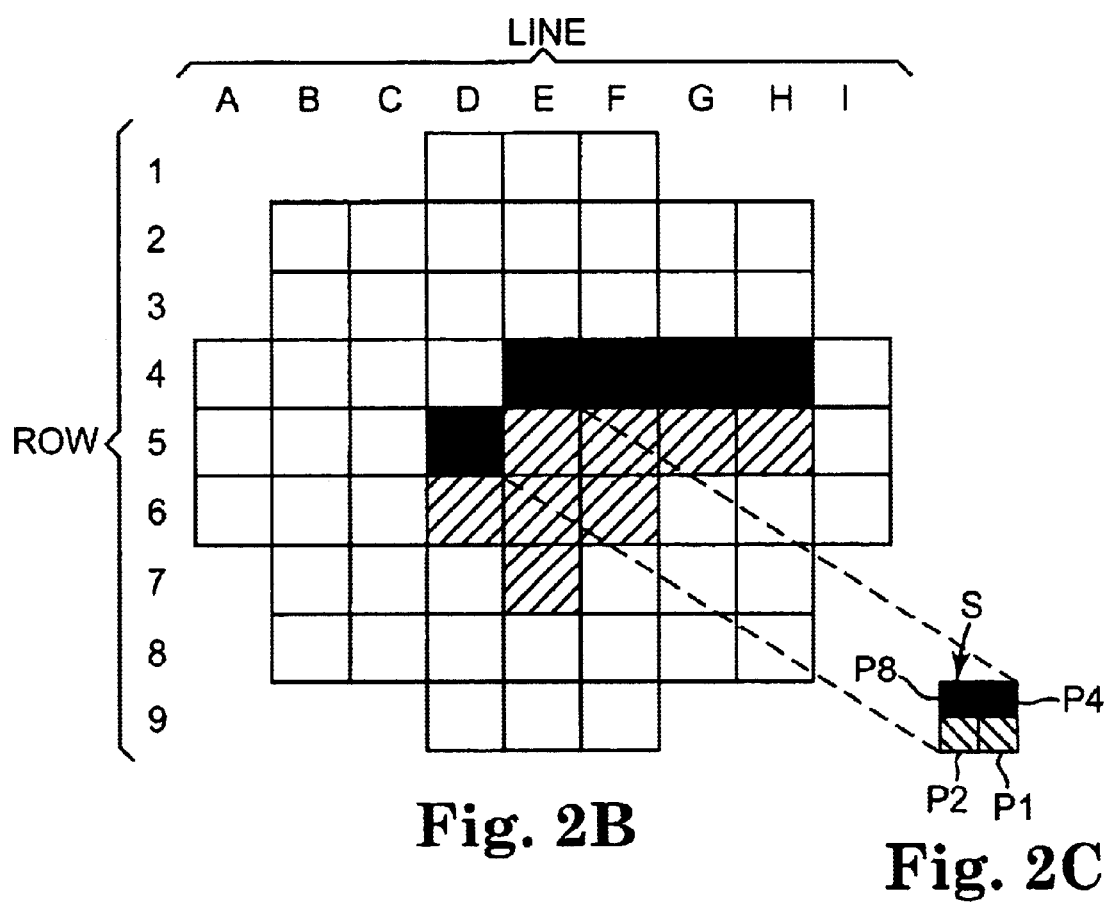
FIGS. 2B and 2C are schematic representations of an input pixel array and its respective TES output superpixel.

FIGS. 2B and 2C schematically represent an input pixel array and its respective TES output superpixel. In FIG. 2B, each square cell in the eighty-one cell array of FIG. 2B (only pertinent ones of which are shown, as the remaining ones are 'don't cares') represents a 300 dpi pixel location that is referenced by a concatenation of its line (alphabetic) and row (numeric) designators. For example, the central cell in the array of FIG. 2B is referred to as the E5 cell or pixel. Pixel E5, which is broadly solidly outlined, is the input pixel that is being processed in an embodiment of TES to determine how it will be represented by a 2×2 600 dpi square superpixel (S). The eighty-one 300 dpi pixels within the window surrounding and including a given, centrally located pixel are referred to herein as the central pixel's neighborhood. The blackened and shaded cells in FIG. 2B, including central cell E5, represent an input pixel pattern that preferably should be edge smoothed to produce high-quality printed output. The pattern contains open, or blank (white) cells that represent 'don't cares'; closed, or filled (black) cells that represent 'on' (black) pixels; and shaded cells that represent 'off' (white) pixels. It has been determined that such a pattern of on and off pixels shown in FIG. 2B within the illustrated window surrounding central pixel E5 represents an output or printed pixel image that would be of relatively low print quality, were there no adjustment (edge smoothing) of the converted higher resolution data prior to printing. It has further been determined that optimum smoothing of the specific input pixel image of FIG. 2B, and thus high print quality, is achieved when the two upper pixels in the 2×2 600 dpi superpixel corresponding to pixel E5 are on, whereas the lower two pixels thereof are off, as shown by the quad pixel, or superpixel, indicated in FIG. 2C, comprising four 600 dpi pixels labeled P1, P2, P4, P8.

Accordingly, every time the neighborhood pattern illustrated in FIG. 2B is encountered in a 300 dpi input pixel image, the central pixel therein, i.e., pixel E5, is automatically replaced in the 600 dpi output pixel image with the illustrated superpixel of FIG. 2C, having the upper two pixels on and the lower two pixels off.

In the preferred embodiment, the TES algorithm is performed by a combinatorial logic circuit. Thus, the TES combinatorial logic circuit generates a 2×2 superpixel based on the input pixel and its 80 neighboring pixels in a 9×9 window, providing a smoother edge in most cases. This corresponding superpixel has been predetermined optimally to smooth jagged edges that otherwise diminish the quality of the higher resolution printed output. The effect is significantly superior, edge-smoothed print quality, especially text quality, at higher resolution, with the processing overhead being borne by the printer rather than the host computer or its user. It will be appreciated that such processing may readily be performed in software, firmware, or most preferably hardware in order to impact minimally on the complexity, speed and cost of the printer and its controller. In some hardware implementations, processing is performed with an ASIC device or a logic array. Detailed boolean logic equations, flow charts, and hardware circuit diagrams for the TES algorithm are described in Lund (U.S. Pat. No. 5,650,858), cited above.

TES-AR

Figure 3A:
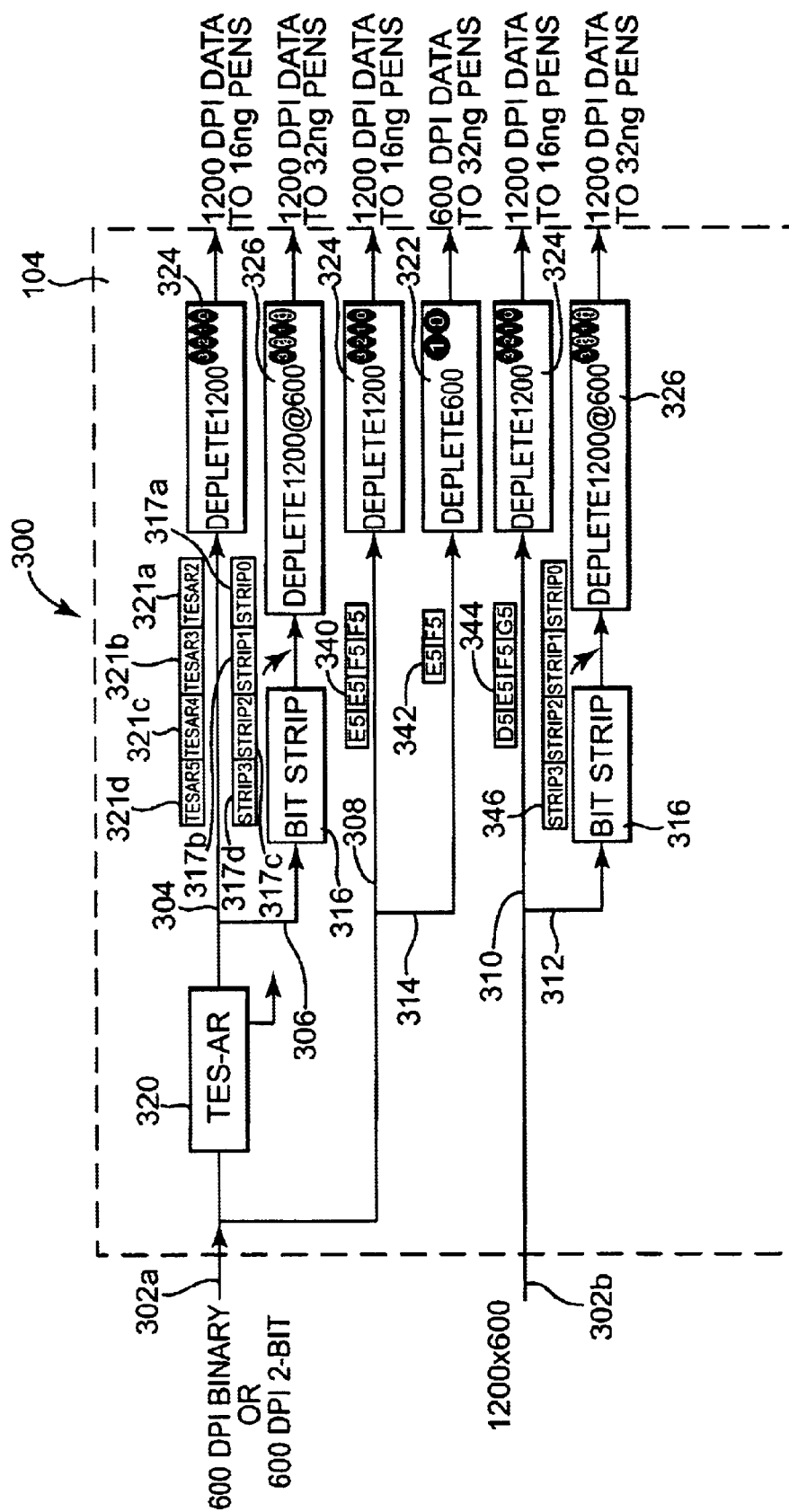
FIG. 3A is a flow diagram of exemplary black datapaths having 600×600 deposit or higher input TES output superpixel.

FIG. 3A is a flow diagram 300 of exemplary black datapaths according to an embodiment of the invention, having input pixel image data 302a or 302b with 600×600 dpi or higher resolution. In datapaths 304 and 306, input pixel data 302a is converted to 1200×600 dpi output image data. According to this aspect of the invention, resolution expansion is asymmetric in the two substantially orthogonal image axes x and y. Although this expansion could potentially be accomplished by applying an embodiment of the TES algorithm (see Lund, U.S. Pat. No. 5,650,858, cited above), it is accomplished with greater efficiency and less complexity by applying a related 'TES-AR' algorithm 320 (acronym for "Thermal Inkjet Edge Smoothing for Asymmetric Resolutions").

Figure 3B:
FIG. 3B illustrates a 2×1 superpixel.

Similar to the TES algorithm, the TES-AR algorithm 320 digitally computes a 2×1 output superpixel from an input pixel and its neighboring 29 pixels. The window of data used for the generation of a TES-AR superpixel is a subset of the TES window shown in FIG. 2B, comprising the pixels within a rectangle of C2 to G7. Logical equations are performed on the bits in the window. Then TES-AR 320 substitutes a preselected asymmetric 2-pixel pattern (i.e., an output superpixel) for the original single central input pixel. One example of a 2×1 superpixel is shown in FIG. 3B.

Table 1 includes logical equations that are performed on the bits in the window. The existence of a dot at a position in the window (e.g., E4 in FIG. 2B) is a logical 1. The equations are self-explanatory.

The result is a significantly improved, edge-smoothed print quality at higher resolution, with the processing overhead being borne by the printer rather than the host computer or its user. It will be appreciated that such processing is readily performed in software, firmware, or most preferably hardware in order to impact minimally on the complexity, speed and cost of the printer and its controller.

Persons skilled in the art will appreciate that the number of TES-AR image logic equations and their particular patterns have been empirically determined to provide a high quality, pseudo-1200×600 dpi output in a variety of output applications. The TES-AR image logic equations listed in Table 1 are believed to represent an optimal but not the only acceptable approach to edge smoothing that accommodates the various, and often competing, goals of 1) preserving stroke weight to the extent possible; 2) minimizing shifts in input pixel image features, and, when shifting is necessary, shifting features minimally (never more than a single 1200 dpi pixel width) and in the same direction; 3) smoothing character fonts in such manner that curves, intersections, endpoints and serifs are accurately reproduced; and 4) preserving the gray-scaled inputs, or halftones, of graphic or pictorial pixel images.

As with TES, if it is determined that there are gray scaled pixels within the neighborhood surrounding and including a given pixel of the input pixel image, the corresponding superpixel produced at the output for printing preserves the gray scale within the original lower resolution input pixel image without edge smoothing.

BITSTRIP

If TES-AR algorithm 320 is applied in a datapath driving an inkjet pen designed to fill a 600×600 dpi dot, e.g., a 32 ng drop-weight pen as illustrated in datapath 306, then 1200×600 dpi output data provides approximately twice as much ink density as a printed page normally can handle. In this situation, the 1200×600 dpi output data from TES-AR algorithm 320 are presented to a unidirectional bitstrip algorithm 316, which removes roughly half of the delivered dots, but preserves the dots at the edges of text strokes and other black lines. Bitstrip algorithm 316 is applied only if full-sized (approximately 32 ng to 35 ng) output drops are used, as in datapath 306, but not if half-sized (approximately 16 ng to 18 ng) output drops are used, as in datapath 304, since half-sized drops already have the appropriate drop weight for 1200×600 dpi output data.

Bitstrip algorithm 316 is an improved version of a prior bitstripping algorithm described in M. D. Lund and S. O. Miller (U.S. Pat. No. 5,270,728), cited above, which receives 600 dpi horizontal data and deletes every second dot to limit ink flux on the page. Improved Bitstrip algorithm 316 is unidirectional and uses table lookups and selective filling in of half-dot "holes" omitted by the prior algorithm. Improved Bitstrip algorithm 316 preserves the edge definition at the end points of a linear series of dots at a resolution of 1200 pixels per inch when outputting at a density of 600 pixels per inch from 1200 pixel per inch input pixel data. Improved Bitstrip algorithm 316 accepts constrained 600 dpi input data that has been expanded, using for example TES-AR algorithm 320, resulting in few dots starting or ending at 'odd' boundaries (right sides of cells).

Figure 4A:
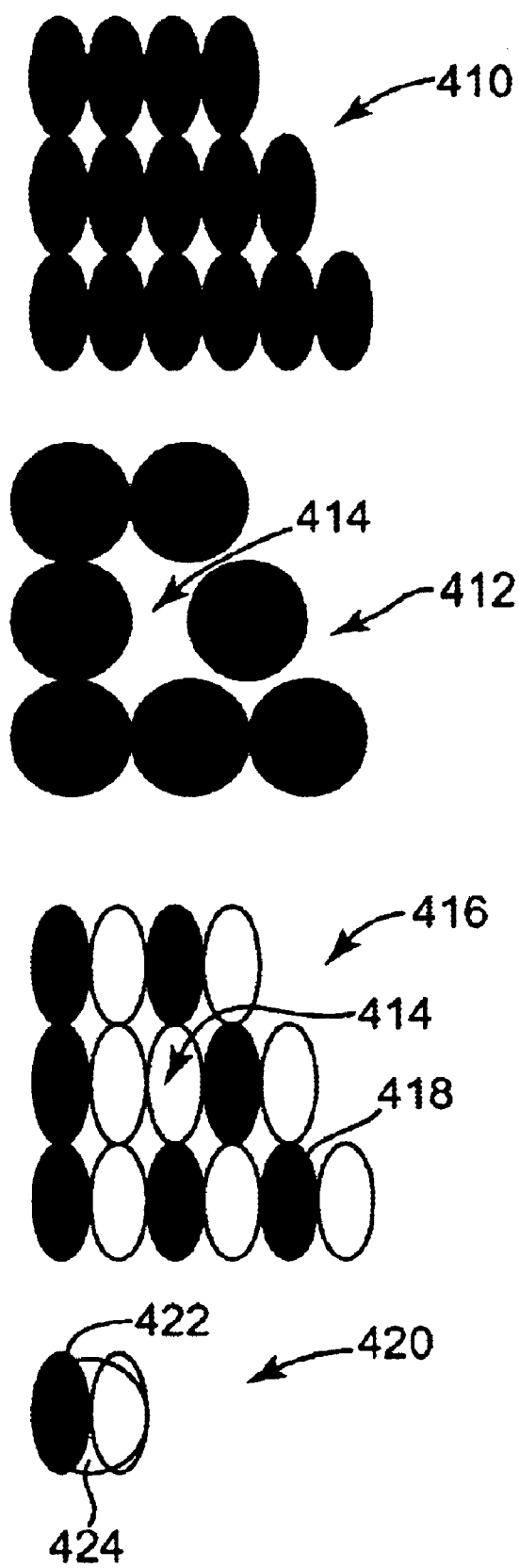
FIG. 4A is a schematic representation illustrating the application of an improved Bitstrip algorithm.

FIG. 4A is a schematic representation illustrating the application of an improved Bitstrip algorithm 316. To preserve edges, improved Bitstrip algorithm 316 can skip two consecutive cells and/or can deliver dots to two consecutive cells. Improved Bitstrip algorithm 316 can also selectively fill in the right or left edge cells or both edge cells. Diagram 410 represents a 1200×600 dpi image composed of 1200× 600 dpi dots. If the image represented in diagram 410 is printed with a 600 dpi pen, approximately half of the dots must be removed to limit the average pixel density on an outputted page, as shown in diagram 412. Illustratively, this dot removal leaves a small hole at position 414, which will mostly fill in with ink from surrounding dots. Bitstrip algorithm 316 can leave this hole unfilled or can fill it depending on the algorithms used. Diagram 416 shows blackened dots, e.g., dot 418, that are actually printed, thereby leaving the hole in position 414 unfilled.

Diagram 420 illustrates the particular convention applied by Bitstrip algorithm 316, i.e., a delivered dot 422 fills the left $\frac{1}{1200}$dpi cell within an original $\frac{1}{600}$dpi dot 424. The convention may be opposite.

Figures 4B, 4C:
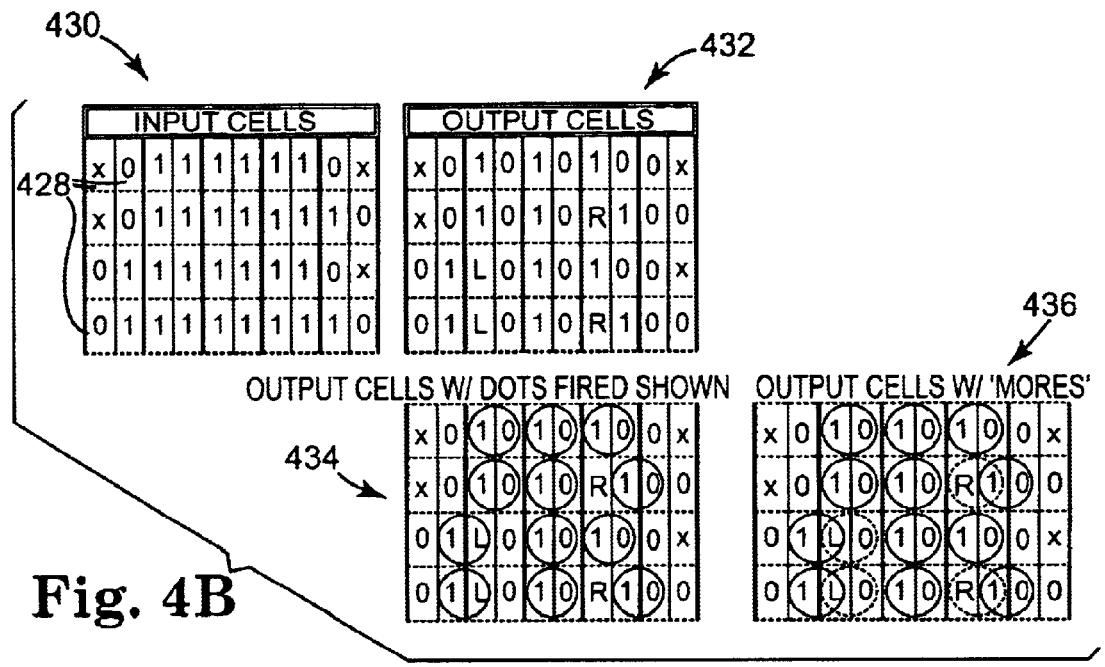
FIG. 4B is a diagram illustrating representative input and output sequences for an improved Bitstrip algorithm, in accordance with an embodiment of the invention.
FIG. 4C is a diagram showing how the Bitstrip algorithm of FIG. 4B actually processes 6 sequential input bits in a row to generate two processed output bits.

Some representative input and output sequences in Bitstrip algorithm 316 are shown in FIG. 4B. Each box, for example boxes 428, in FIG. 4B represents the position for a 1200×600 dpi pixel in an "Input Cells" and an "Output Cells" window 430 and 432 respectively. For ease of understanding, pixel position boxes 428 are arranged in rows and columns. Bitstrip algorithm 316 is used when firing a 600 dpi drop (e.g., using a 32–35 ng pen) in the 1200×600 dpi location. The "Input Cells" window shows 4 possible strings of dots (represented by 1's), starting on all combinations of odd and even columns. The "Output Cells" window shows the resultant firing pattern, after processing by Bitstrip algorithm 316 of pixel data row by row from the "Input Cells" window. The following definitions apply to the pixel symbols in FIG. 4B:

0: deliver no output dot

1: deliver one output dot x: Don't care input bit (can be a 0 or a 1)

R: dot outputted only if 'more on right' option enabled

L: dot outputted only if 'more on left' option enabled.

The R and L dots are outputted if their respective 'more on left' or 'more on right' flags are preselected. If R and/or L flags are selected and their respective options enabled, then an extra dot is outputted at the respective R and/or L pixel position to effectively darken the edges of the pattern. The extra dot fills in a gap or "hole" in a row of otherwise black text or solid image pixels, and partially overlaps an existing black edge pixel. This process is known as "double firing," because it requires a 600×600 dpi pen in an ink jet printer to fire in two adjacent 1200×600 dpi pixel positions, as described below in more detail. Improved Bitstrip algorithm 316 uses the following combinations of "more on R and/or L":

1. None (no dot at R or L positions; less ink delivery)
2. Right (print dot at R position)
3. Left (print dot at L position)
4. Right & Left (print dot at both R and L positions)
5. Alternate R & L (alternate printing dot at R and L locations)

Output windows 434 and 436 illustrate how the output dots generated in output window 432 are positioned. These are shown to clarify how Bitstrip algorithm 316 acts on input data. Output window 434 illustrates an output pixel pattern without enabling "more on right and/or left." Each cell having a "1" is enclosed in a circle representing a delivered ink dot. Each circle is offset toward the right hand side of the "1" in accordance with the convention described in connection with FIG. 4A. No extra ink is printed in the R and L positions in diagram 434 because "more on right and/or left" is not enabled. In diagram 436, on the other hand, "more on right and/or left" is enabled. Accordingly, extra ink is delivered by printing dots in the R and/or L positions, as represented by broken circles enclosing symbols R and L respectively. These circles are offset toward the right and left hand sides of respective symbols R and L, and partially overlap ink dots delivered to the right and left respectively of symbols R and L.

FIG. 4C is a diagram showing how Bitstrip algorithm 316 actually processes 6 sequential input bits in a row to generate two processed output bits. The "in" table to the left in FIG. 4C represents all possible 64 input patterns of 6 sequential pixels (fewer are shown due to the don't care conditions), and the "out" column to the right in FIG. 4C shows the resultant 2 output pixels, which replace the two center input pixels, outlined in a darker border, in each respective row. Boolean logic equations for Bitstrip algorithm 316 are listed in Table 2.

Figure 4D:
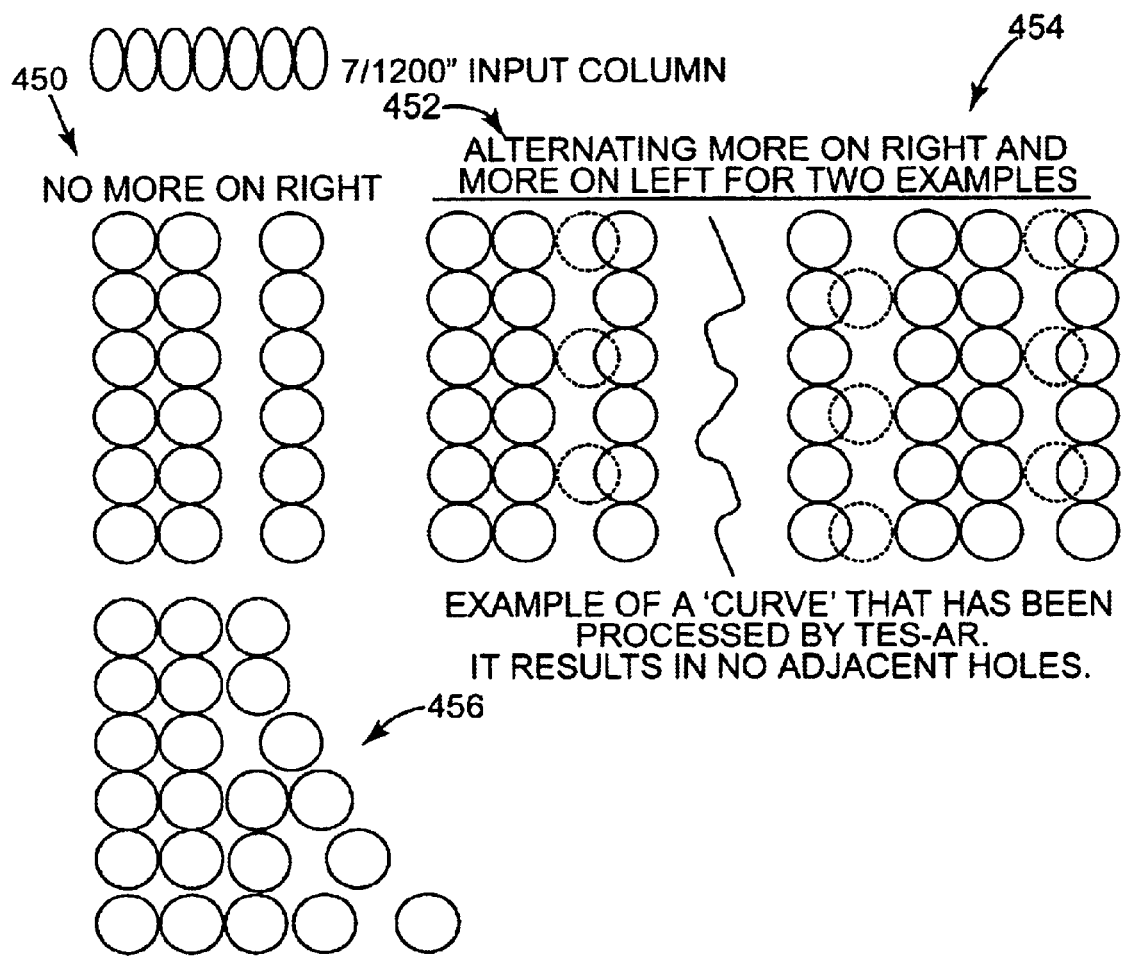
FIG. 4D is a series of diagrams illustrating the effects of "more on right and/or left" in conjunction with the Bitstrip algorithm of FIG. 4C.

FIG. 4D is a series of diagrams illustrating the effects of "more on right and/or left" in conjunction with Bitstrip algorithm 316. If "more on right and/or left" is not enabled, Bitstrip algorithm 316 can produce small 'holes' within a text character or black line, as illustrated in the example of true 1200×600 dpi rendering of a $\frac{7}{1200}$th wide input column in diagram 450 of FIG. 4D. In printing, e.g., with an ink jet printer, such 'holes' are normally filled in by ink flow from surrounding pixels, and are typically too small to see. These holes then result in an ink usage which is slightly less than what would be used for 100% ink delivery. Adjacent holes can produce a more noticeable visual effect. If the fluidic refill properties of an ink firing chamber of a printer permit firing 2 or more adjacent dots at the 1200×600 dpi rendered resolution, the "more on right and/or left" options can be used advantageously to fill in holes. This results in a slight excess ink delivery, generally too little to notice, as shown in the broken circles in diagram 452 of FIG. 4D. An alternative solution is to apply the "more on right" and "more on left" to alternating rows of output pixels, as illustrated in diagram 454 of FIG. 4D. This preserves an average pixel density approximately equal to that originally outputted, and prevents holes from occurring adjacent one another. In the case of applying improved Bitstrip algorithm 316 to 1200×600 dpi data that has been generated by TES-AR algorithm 320, all vertical line widths are preserved, thereby leaving no holes. Holes are thereby generated only on 'curves', and generally not adjacent to one another, as shown in diagram 456 of FIG. 4D, making double firing unnecessary. Printer drivers typically generate symmetrical resolutions. Accordingly, TES-AR algorithm 320 is generally used instead of outputting at the higher 1200×600 dpi resolution.

The enabling of the more on right and/or left may be performed using the host computer to convey control signals to the systems of FIGS. 2A or 3A or by controlling switches coupled to the systems of FIGS. 2A or 3A.

DEPLETE

Referring to FIG. 2A, in datapaths 204 and 206 a depletion algorithm 226 is used to adjust the ink delivered per unit area by 32 ng drop weight pens at high resolution, e.g., 600 dpi or greater. Ink drops delivered from an inkjet pen normally vary in drop weight (or volume) by as much as +/−25% due to typical manufacturing tolerances and variable operating conditions. To adjust for these tolerances in various embodiments, nominal ink drop weight is set higher than desired, and depletion algorithm 226 is applied to reduce average ink delivery in the range of 0–25% by selectively omitting ink dots to obtain a desired ink flux on a printed page. Depletion algorithm 226 and similar depletion algorithms 322, 324, and 326 (see FIG. 3A), described below in more detail, are improved versions of earlier depletion algorithms described in Pritchard (U.S. Pat. No. 5,706,414) and in Castle et al. (U.S. patent application Ser. No. 09/041,408), cited above. Improvements over these earlier algorithms include applying a 600 dpi depletion mask to 1200 dpi image data, and selectively lowering MLP density levels.

Figure 5A:
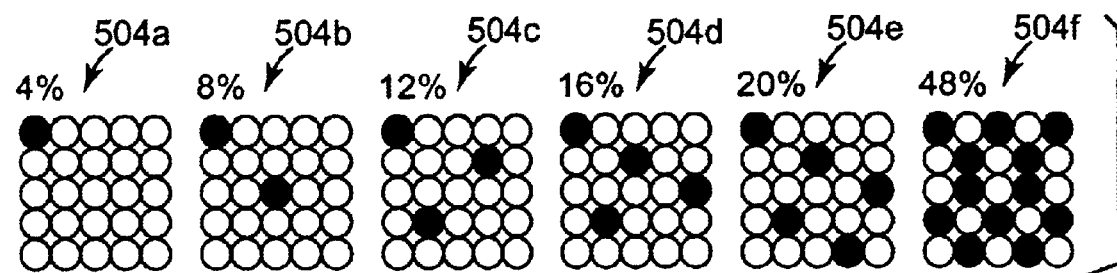
FIGS. 5A and 5B are diagrams illustrating criteria for drop weight depletion.
Figure 5A:
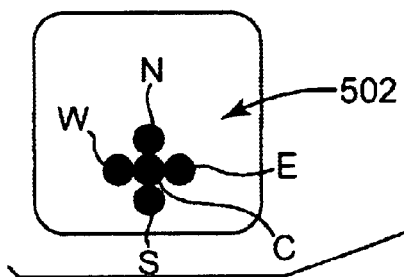
Figure 5B:
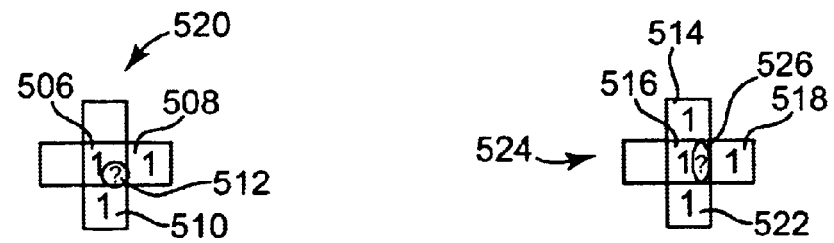

Depletion of the black pen data is typically performed in hardware. FIGS. 5A and 5B are diagrams illustrating criteria for drop weight depletion. Depletion algorithm 226 is applied at the maximum firing rate (1200×600 for 18 ng pens and 600×600 dpi for 32 ng pens). The depletion algorithm looks at five neighboring pixels CNSEW (center+north+south+east+west), and if NSEW are all DARK, as shown in diagram 502, then the center pixel C is ANDed with a depletion mask, as illustrated in diagrams 504a–504f. An appropriate depletion mask is selected either manually or automatically, as described in Castle et al. (U.S. patent application Ser. No. 09/041,408), cited above, to provide the desired per cent average depletion, e.g., between 4% and 48% as illustrated in the 5×5 dot masks of FIG. 5A, and is digitally aligned to the digitized input page. In some implementations, only the highest density, e.g., '11' DARK MLP dots for 2 bit black data are treated as 'on.' Each mask 504a–504f shown in FIG. 5A is applied as if infinitely tiled across the page and is always used at the output resolution. An image data dot is slated for depletion only if it aligns digitally with a blackened dot of the selected mask, for example mask 504a.

Referring to FIG. 5B, expansion of 300 dpi×300 dpi data to 600 dpi×600 dpi data requires examination of three input resolution pixels 506, 508, 510 only (see diagram 520), because all of the NSEW+center (pixel 512) output pixels are contained within these three input pixels. Asymmetric TES-AR expansion of 600 dpi×600 dpi input data to 1200×600 dpi output data requires examination of four input resolution pixels 514, 516, 518, 522, as illustrated in diagram 524. Illustratively, in an image pixel array 520, each square represents an input image dot having input resolution of 300×300 dpi. A square containing a numeral '1' is on, e.g., DARK. The circle 512 represents an output image dot at a resolution of 600×600 dpi. The output image dot will be depleted if itself and the 300×300 dpi input image dots bordering the 600×600 dpi output image dot are all "on," provided that it also meets the mask criteria described above in connection with FIG. 5A. If depleted, this dot will take on a lower density value, which will be '0' for binary data, or a lowered multibit level for multilevel (MLP) data. In an image pixel array 524, each square represents an input image dot at input resolution of 600×600 dpi, whereas the ellipse 526 represents an output image dot at a resolution of 1200×600 dpi. The 1200×600 dpi output ellipse 526 will be depleted only if itself and all of the 600×600 dpi input image dots 514, 516, 518, and 522 bordering ellipse 526 are "on," provided that it also meets the depletion mask criteria described above in connection with FIG. 5A. Any mask size can be used, preferably in the range of 5×5 to 8×8 pixels. A 5×5 mask provides 1/25 or 4% minimum average density steps, whereas an 8×8 mask provides 1/64 or 1.6% average density steps. A 5×5 dot mask size is frequently chosen, as shown in FIG. 5A, to minimize hardware complexity and to avoid pattern beating with potential 4×4 and 8×8 halftoning algorithms. Table 3 lists boolean logic equations that implement depletion algorithm 226.

Figure 5C:
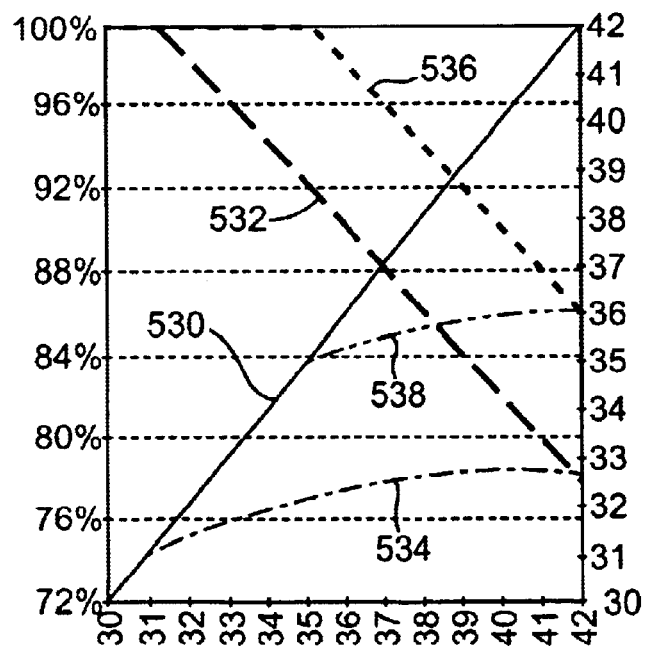
FIG. 5C is a graphic representation showing how drop-weight based depletion provides a nearly uniform delivered ink flux across the range of physical drop weights.

FIG. 5C is a graphic representation showing how drop-weight based depletion provides a nearly uniform delivered ink flux across a range of physical drop weights. The horizontal axis denotes the physical drop weight of the pen in nanograms. The vertical axis on the right denotes effective average delivered drop weight, also in nanograms. The vertical axis on the left denotes the corresponding depleted drop weight per cent. If no depletion is applied, then the result is illustrated graphically by the diagonal straight line 530. For an applied depletion per cent shown by curve 532 (delivered drop weight per cent declining with increasing physical pen drop weight), the delivered ink flux, as illustrated by curve 534, is near 32 ng over most of the displayed range of physical drop weights. A different applied depletion per cent curve, e.g., curve 536 results in a different delivered ink flux dependency, e.g., curve 538. In the implementation depicted in FIG. 2A, DEPLETE algorithm 226 is used only for the black pen to limit the ink on text and black lines. The printing system has knowledge of the black and color drop weights, and color matches images and graphics based on the image and on the physical drop weights of the pens, for example as described in Castle et al. (U.S. patent application Ser. No. 09/041,408), cited above.

TRANSITION TO FINAL DATAPATH ALGORITHMS

Datapaths shown in FIGS. 2A and 3A support 1, 2, and/or 3 bit input data at 300, 600, and 1200 dpi. TES and TES-AR hardware circuits process only "binary" data (OFF and DARK pixels). Subsequent algorithms (e.g., MLP, Deplete600 Deplete1200, etc.) receive their input data from the output of TES/TES-AR algorithms and generate the desired number of output density levels, which is the same as in the input data. Any gray (LIGHT or MEDIUM) pixels within an input window bypass the TES/TES-AR circuit, and are "dumb" doubled (asymmetric expansion) or quad doubled (symmetric expansion) as required to provide a desired output rendering, as in datapaths 204, 208, and 308. If TES/TES-AR is bypassed, the input center pixel is simply passed through and copied. In datapaths 310, 312, and 314, on the other hand, no expansion or doubling is required, because the input and output resolutions are the same. However, depending on the drop weight characteristics of the printer pens relative to the output data resolution, datapaths 204, 208, 308, 310, 312, and/or 314 can include appropriate black data processing algorithms, such as depletion 226, 322, or 324; bitstrip 316; and/or MLP level restoration 224. If the input center pixel is processed by TES/TES-AR, the output superpixel contains only binary OFF or DARK subpixels. A simple hardware circuit (e.g., using a doubling clocking technique) "dumb doubles" the data, if it is 600 dpi horizontally instead of 1200 dpi.

4X TES-AR

BITSTRIP algorithm 316, described above, uses six input bits to generate (at 1200 dpi) two output bits. BITSTRIP algorithm 316 works on the final output, thus using three identical TES-AR algorithms (represented by block 320) to generate the six sequential input bits for Bitstrip algorithm 316. The three TES-AR algorithms are separately identified as 712, 714, and 716 in FIG. 7. A fourth identical TES-AR algorithm (also represented by block 320) is added in parallel, providing a total of 8 output bits, which can be processed by two identical Bitstrip algorithms (represented by block 316 in FIG. 3A and shown as algorithms 734 and 736 in FIG. 7), thereby generating $\frac{1}{1200}$th dpi output data. In FIG. 3A, four bits to be printed that have been processed by the TES-AR algorithms 320 are shown as bits 321a–321d, and four bits to be printed that have been processed by the Bitstrip algorithm 316 are shown as bits 317a–317d. At each clock cycle, $\frac{1}{1200}$ths of an inch of print data are generated. In this manner, a slight increase in hardware doubles the overall efficiency of the circuit.

Table 1 lists the TES-AR boolean equations that are used in accordance with the above embodiment. It will be understood that the boolean variables, or terms, that are combined correspond with the logical input pixels within the neighborhood surrounding a given pixel. The boolean negation (inversion: NOT) operator is designated by an apostrophe, the logical AND operator is designated by an asterisk, and the logical OR operator is designated by "+". The image logic equations represented in Table 1 have been determined empirically to produce high-quality, edge-smoothed output pixel images, although it will be understood that other variations are possible within the scope of the invention.

Referring to Table 1, it can be seen that only a limited set of neighborhood pixels is taken into consideration for a given central input pixel. Because the remaining logical input pixels do not affect the edge-smoothing determination, they are 'don't cares' and thus are omitted as terms in the boolean combinations. The output superpixel (such as shown in FIG. 3B) is substituted for the initial central pixel by implementing the output boolean logic equations for TES-AR. listed in Table 1. The 8 output bits of the four TES-AR algorithms are designated TESAR0–TESAR7. The prefix "K" preceding cell designations denotes "Key" (black) datapath.

Figure 6A:
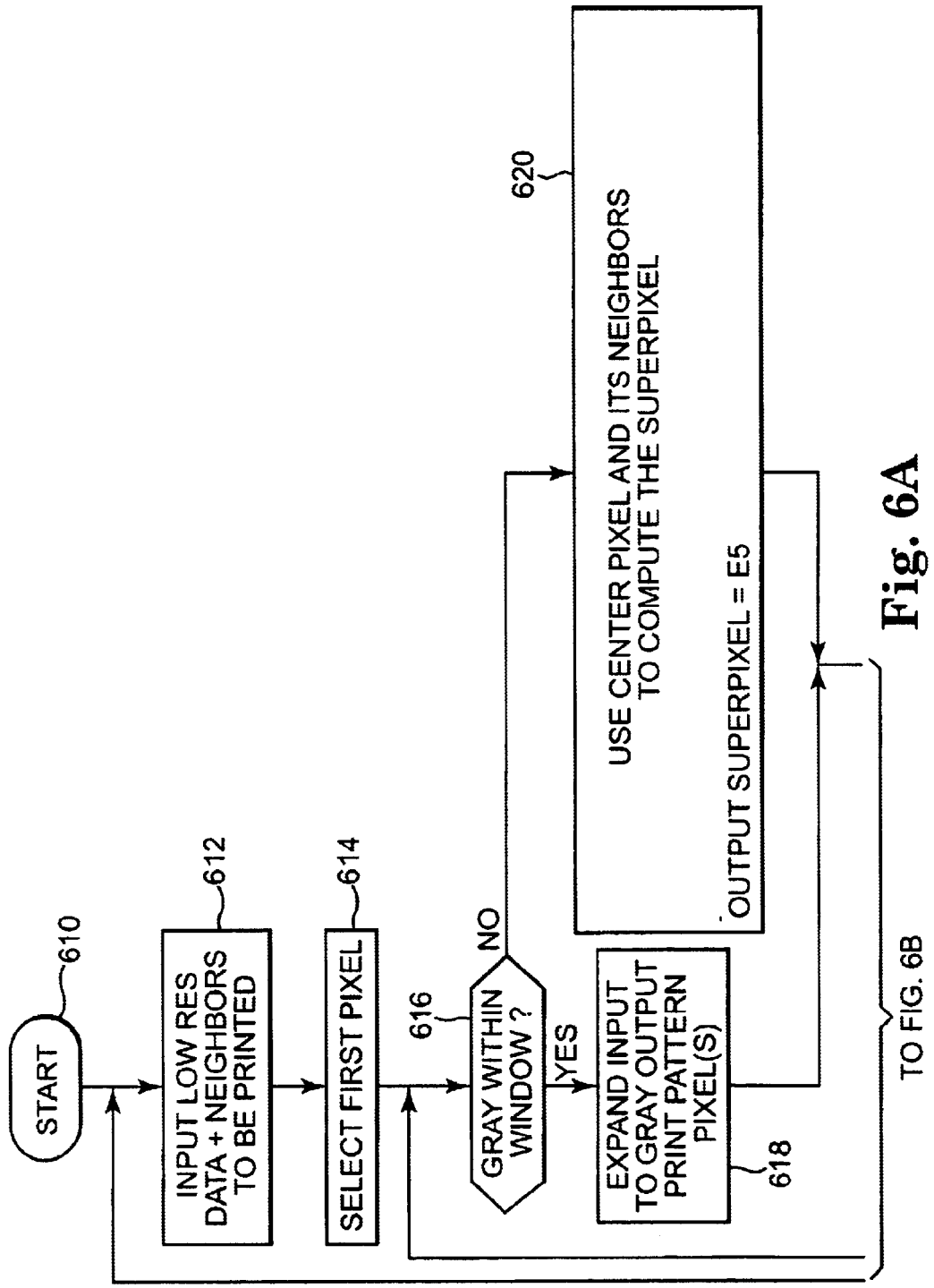
FIGS. 6A and 6B are logic flow diagrams illustrating a method of applying a TES-AR algorithm, in accordance with an embodiment of the invention.
Figure 6B:
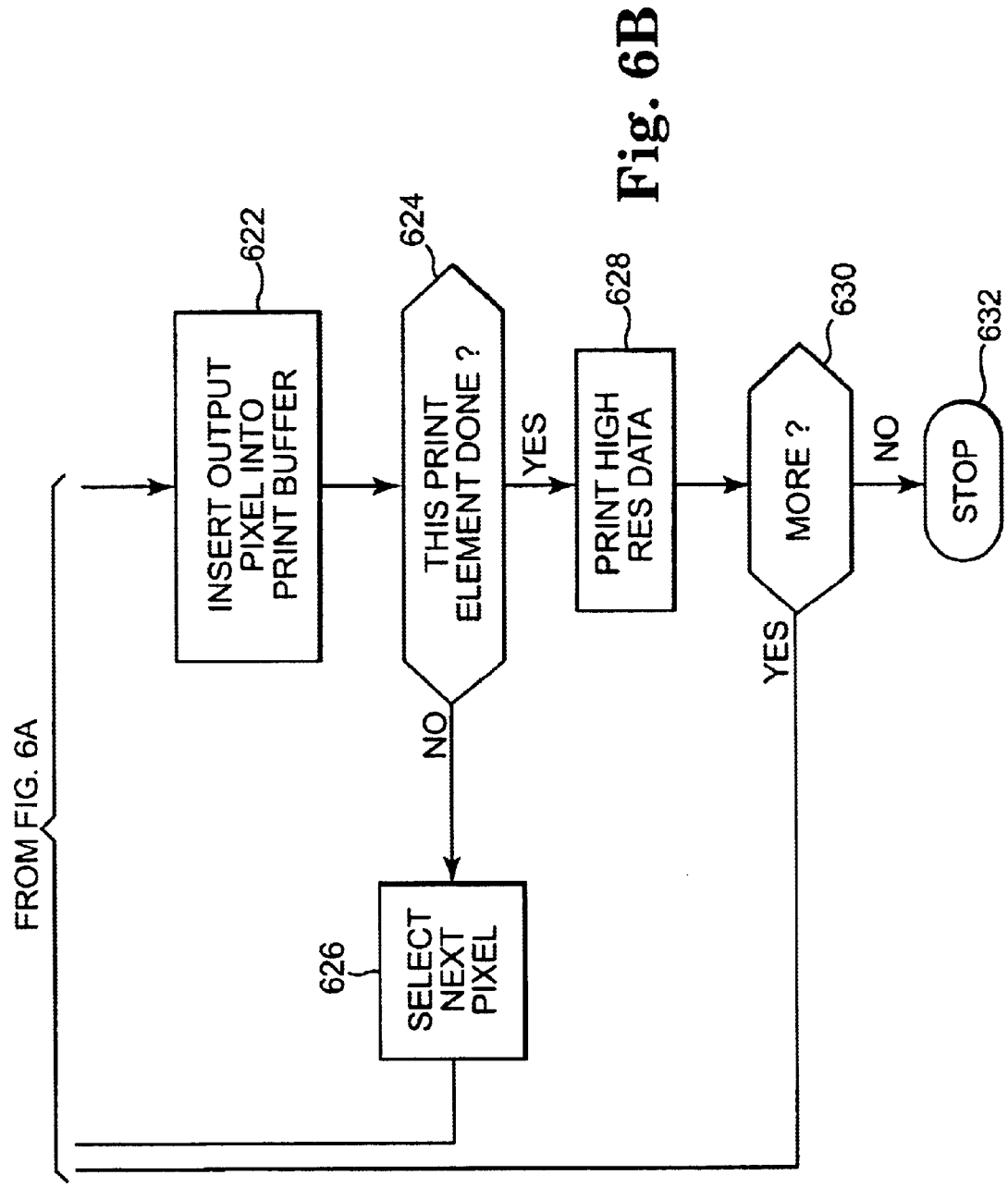

FIGS. 6A and 6B contain a logic flow diagram illustrating a method of applying TES-AR algorithm 320 in accordance with the invention. The input pixel image resolution-expansion method that is illustrated in FIGS. 6A and 6B is for use in a printer having a relatively high resolution, e.g., 1200 dpi by 600 dpi, wherein the input image resolution from a host computer is relatively lower than that of the printer. One such printer is described in U.S. Pat. No. 5,966,155, assigned to Hewlett-Packard Company and incorporated herein by reference.

Starting at 610, the method includes first inputting at 612 the low-resolution (LOW RES) pixel image data within a pixel neighborhood to be printed to the printer or printer controller. It will be appreciated that such input data can represent columnar pixel data destined for a vertical printhead, an entire raster of pixel data, a partial page of pixel data, or a full page of pixel data to be printed. Advantageously, in accordance with the illustrated method and system of the invention, such low-resolution input pixel data within the pixel neighborhood requires no large pixel data buffering. This occurs because, as described below in more detail, the input pixel data are expanded and optionally smoothed on the fly at a rate that does not impact the printer's throughput.

The illustrated method further includes at 614 selecting a first, or given, pixel such as the central one within the pixel neighborhood. Because the input pixel image data of the lower resolution may be gray scaled, it is determined at 616 whether there is any such gray scale data within a defined window. If so, the first or given pixel to be produced at the high resolution within the window is merely expanded, e.g., doubled, in resolution at 618 into its original density, output print pattern pixel or plural-pixel set, whereby no smoothing and thus no halftone image distortion or loss of contrast therefrom occurs. Accordingly, in the case of gray scaled data within the defined input pixel data window, wherein the defined window preferably is smaller than the entire pixel neighborhood, the plural-pixel image that is produced at the higher resolution is such that the gray scale of the input pixel image data of the lower resolution is preserved.

If there is no gray within the defined window, then mapping of the first, or given pixel may be seen from FIGS. 6A and 6B at 620 to include preferably, for each first, or given pixel within the input pixel data, using the pixel data neighboring the first, or given pixel with plural, predefined pixel data image logic equations, thereby computing the smoothed version of the target center pixel at the higher resolution. The first, or given pixel, is then substituted with a plural-pixel image, e.g., a 2×1 superpixel, at the higher resolution as represented by the OUTPUT SUPERPIXEL= E5 logical construct, as determined by the series of TES-AR output boolean equations listed in Table 1.

The method further includes inserting at 622 the output superpixel, whether produced at 618 or at 620, into a print buffer and determining at 624 whether the physical print element's data have all been expanded. If not, then at 626 the next low-resolution input pixel (which becomes the next given pixel) is selected, and the above steps 616 and 618 or 620 are repeated. If the print element's data all have been expanded, then at 628 the high-resolution (HIGH RES) data is printed. It will be appreciated that printing at 628 the produced plural-pixel image at the higher resolution edge smoothes the pixel image of the higher resolution in the printed output. So long as there is more low-resolution input pixel data to be processed, as may be indicated at 630, subsequent input pixel image data are processed identically beginning at 612. When there is no more data, then input pixel image data processing stops at 632.

The general method described in FIGS. 6A and 6B above for applying TES-AR algorithm 320 is similar to that illustrated for TES algorithm 212 in FIGS. 3A and 3B of Lund (U.S. Pat. No. 5,650,858), cited above. The two methods differ, among other reasons, because TES provides edge smoothing for symmetric expansion, whereas TES-AR provides edge smoothing for asymmetric expansion.

Figure 7:
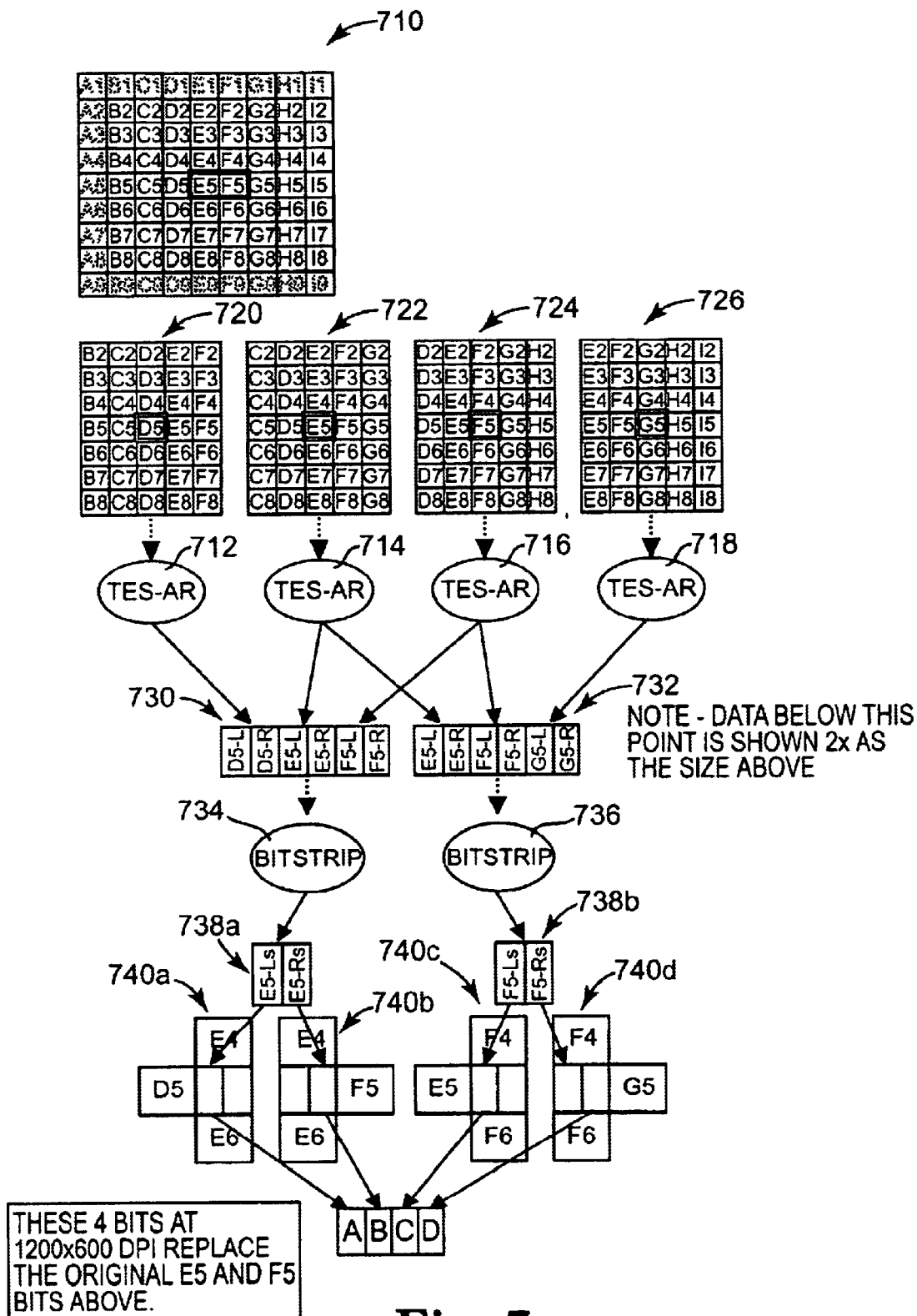
FIG. 7 is a schematic flow diagram illustrating a cooperative series hardware implementation of TES-AR, Bitstrip, and Depletion algorithms in a common datapath.

FIG. 7 is a schematic flow diagram illustrating a cooperative series hardware implementation of TES-AR, Bitstrip, and Depletion algorithms in a common datapath, such as datapath 306 in FIG. 3A. An input window 710 contains the image pixel data needed by TES-AR algorithm 320. Each pixel within input window 710 is labeled alphanumerically, as described in connection with FIGS. 2B and 2C. In the implementation illustrated in FIG. 7, TES-AR algorithm 320 is configured to use only an 8×7 pixel input window, having $\frac{1}{600}$th dpi input pixels. Other TES-AR embodiments can use any other input resolution and a variety of input window sizes.

Each of four parallel TES-AR circuits or algorithms 712, 714, 716, and 718 processes a respective 5×7 pixel window segment 720, 722, 724, or 726 of input window 710. Window segments 720, 722, 724, and 726 overlap, and have respective central pixels D5, E5, F5, and G5, which are adjacent to one another. Applying TES-AR processing logic, as described above, TES-AR circuit 712 replaces central 1/600th dpi input pixel D5 with an output superpixel comprising 1/600th ×1/1200th dpi output pixels D5-L and D5-R. Concurrently, TES-AR circuit 714 replaces central input pixel E5 with output pixels E5-L and E5-R, TES-AR circuit 716 replaces central input pixel F5 with output pixels F5-L and F5-R, and TES-AR circuit 718 replaces central input pixel G5 with output pixels G5-L and G5-R.

Bitstrip algorithm 316 requires as input the two target bits to be processed and the two bits (pixels) to the left and two pixels to the right of the two target bits. Bitstrip algorithm 316 removes about one-half of the pixels to be fired, when 1200×600 dpi data are used with 32–35 ng drop weight pens. Accordingly, the output bits from TES-AR circuits 712, 714, 716, and 718 are formatted into two input data blocks 730 and 732 for concurrent processing by respective bitstrip circuits 734 and 736. Input data blocks 730 and 732 contain overlapping TES-AR output pixels D5-L, D5-R, E5-L, E5-R, F5-L, F5-R and E5-L, E5-R, F5-L, F5-R, G5-L, G5-R, respectively. Bitstrip circuits 734, 736 produce output data blocks 738a, 738b, comprising bitstripped output bits E5-Ls, E5-Rs, and F5-Ls, F5-Rs, respectively. This bitstrip output data, along with neighboring pixel data from original input window 710, are processed by four parallel drop weight based depletion circuits 740a–740d to remove a small per cent of the resultant ink to be fired, applying the drop weight depletion criteria logic described in connection with diagram 524 of FIG. 5B above. Data bits meeting the depletion criteria are then ANDed with a preselected drop weight depletion mask (not shown), and are output as 4 bits A, B, C, D of processed image data at 1/1200×1/600th dpi, replacing original central bits E5 and F5 in input window 710.

MLP (MULTILEVEL PRINTING)

Figure 8B:
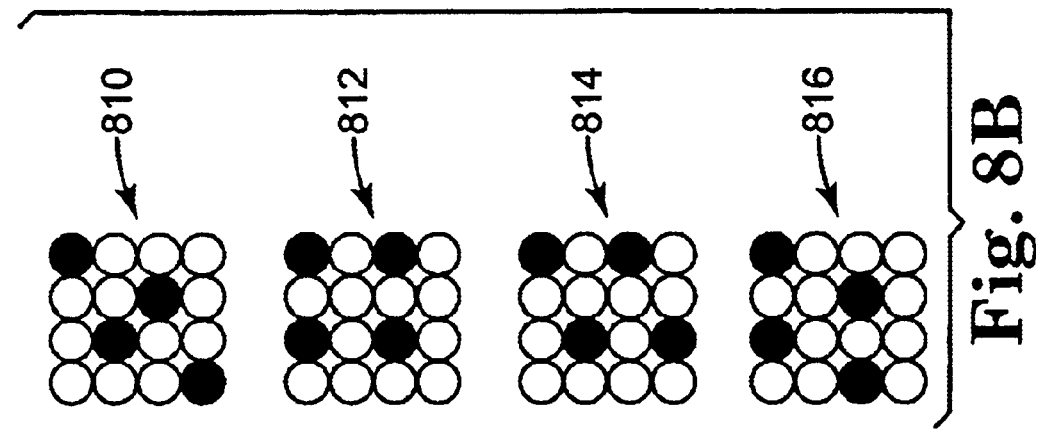
FIG. 8B is a diagram illustrating various expansions of the 300 dpi "LIGHT" level MLP data with a 600 dpi printhead.
Figure 8A:
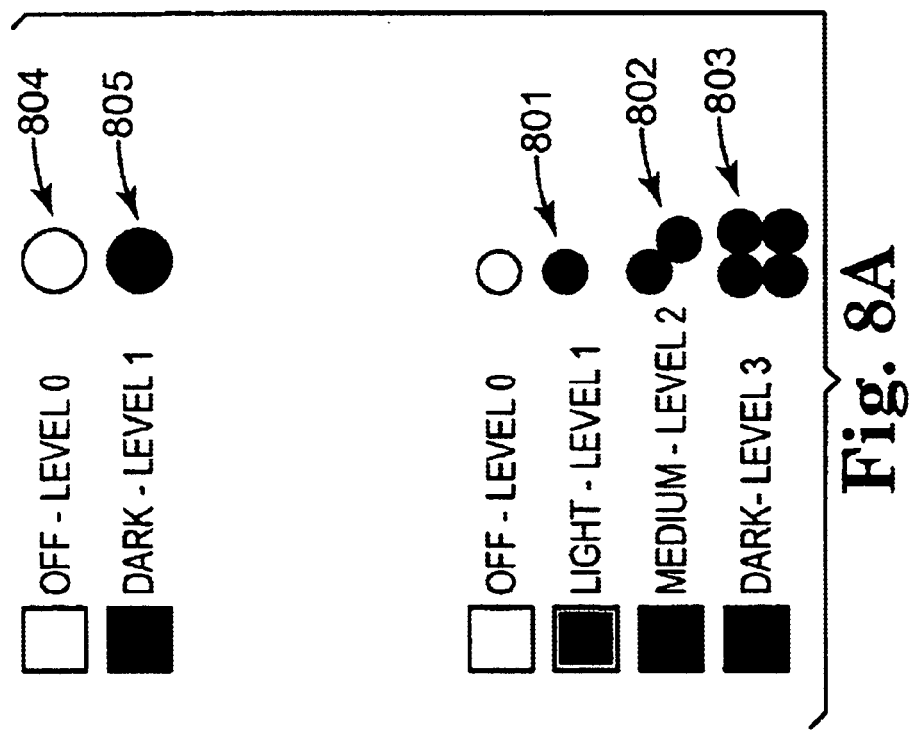
FIG. 8A is a diagram illustrating 2 bit (four level) multilevel printing (MLP)

FIG. 8A is a diagram illustrating 2 bit (four level) MLP. A pixel can contain multiple drops of ink, generally containing a smaller ink volume than required to generate a fully saturated color. For example, using a 1/600dpi pen to print 300 dpi image data, 4 drops of ink are used to generate the 1/300dpi pixel of black (DARK=level 3), shown in pixel 803. However, fewer than 4 drops per 1/300dpi pixel will generate a "lighter" color, e.g., LIGHT (level 1) for 1 ink drop, as in pixel 801, and MEDIUM (level 2) for 2 ink drops, as in pixel 802. By contrast, conventional binary print data can produce only two density levels in a pixel, e.g., OFF, as shown in pixel 804, and DARK, as shown in pixel 805.

FIG. 8B is a diagram illustrating various expansions of 300 dpi binary print data to 600 dpi for multilevel printing (MLP) with a 600 dpi printhead. In the example, using a 4×4 pattern, one 1/600dpi dot is fired per 1/300dpi cell, as shown by the blackened locations. The 1/300dpi dot can be positioned in different locations within the pattern. The 4×4 pattern is tiled across the entire printed page. Pattern 810 shows the dots being spread out in each row and each column. Pattern 812 shows the dots fired into the same rows and columns. Patterns 814 and 816 show different dot patterns. All four patterns 810, 812, 814, 816 provide for 25% density, equivalent to level 1 (LIGHT) described in FIG. 8A above, but do so in different ways. If two bit data at 300 dpi is sent to a 600 dpi pen, the hardware will generate one of these patterns. The selection "programmed" into the hardware is determined by subjective judgment based on print quality and hardware capability. Any MLP gray input data (levels '01' and '10') within the 9×9 input cell will disable TES corrections. Gray levels slightly outside of the TES window may also disable TES corrections.

Figure 8C:
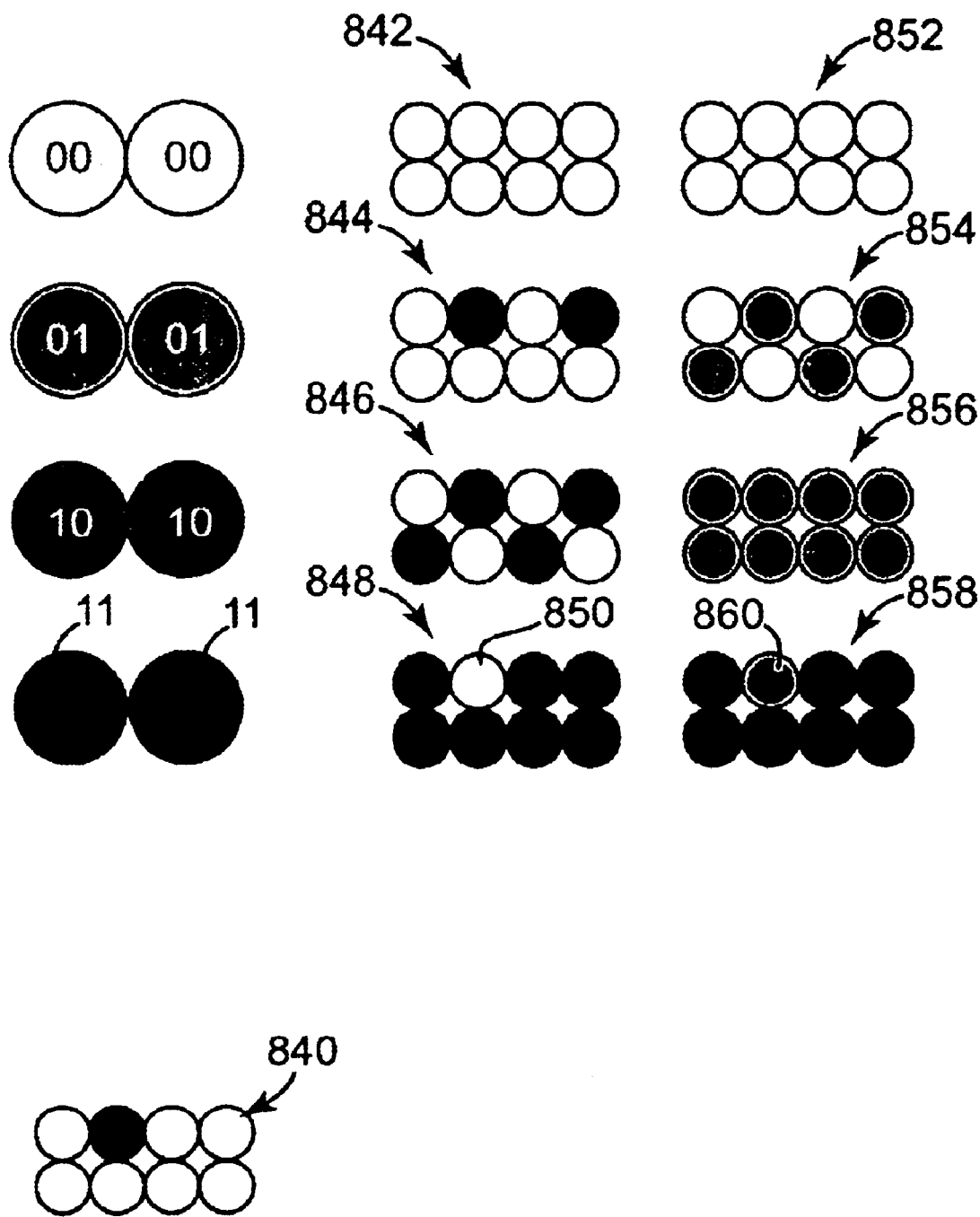
FIG. 8C is a diagram illustrating the interaction of a depletion algorithm with MLP expansion, in accordance with an embodiment of the invention.

FIG. 8C is a diagram illustrating the interaction of depletion algorithm 226, 324 with MLP expansion, in accordance with an embodiment of the invention. Input image data is shown at the left as pairs of adjacent identical dots denoted by their two bit MLP levels, i.e., 00, 01, 10, and 11. In conventional systems, a MLP expansion of 300 dpi input data results in higher resolution output pixel patterns 842, 844, 846, 848, which are then masked by a depletion mask, e.g., mask 840. The higher resolution output pixels are binary, having only OFF and DARK density levels, and the masked region is never printed (see position 850 of pattern 848), even if two drops are normally to be printed in that position. No depletion occurs in conventional output pixel patterns 844 and 846, because the neighboring pixel criterion is not met. Output pixel patterns 852, 854, 856, 858 represent the results of applying MLP expansion and depletion mask 840 according to the present invention, in the case where a DARK density dot in any output resolution pixel requires more than one ink drop. In this example, the masked dot is not omitted, but is printed at a lower MLP density (see position 860 of pattern 858). The actual MLP density level printed at position 860 can be predetermined in both hardware and software implementations.

SERIES ALGORITHMS

Referring to FIGS. 2A and 3A, in datapath 206, TES algorithm 212 delivers 600 dpi output data to DEPLETE algorithm 226 for 32 ng drop weight pens 232. Alternatively, TES delivers 600 dpi output data in datapath 210 to an MLP expansion algorithm 224 for expansion to 1200 dpi MLP data for 16 ng pens 230. TES also bypasses gray pixels, as denoted by the symbol G in FIG. 2A. In datapaths 204 and 208, TES is bypassed (block 222) and the black central input pixel (denoted K E5) is simply passed through to the subsequent processing stage. In datapath 204, DEPLETE algorithm 226 is applied to provide 600 dpi output data to 32 ng pens 232, whereas in datapath 208, MLP expansion algorithm 224 is applied to provide 1200 dpi MLP output data to 16 ng pens 230. In datapaths 250 and 252, a resolution expansion algorithm 254 is needed to expand 300 dpi input data to 600×1200 dpi output data. Application of TES algorithm 212 in series with TES-AR algorithm 320 to the datapath is one implementation for expansion algorithm 254, which also advantageously provides edge smoothing. For 32 ng pens 234 in datapath 252, Bitstrip algorithm 316 and DEPLETE algorithm 326 (similar to DEPLETE algorithm 226) are applied sequentially. For 16 ng pens 230 in datapath 250, DEPLETE algorithm 324 is applied.

In datapaths 304 and 306 (see FIG. 3A), 600 dpi binary input image data is expanded and edge smoothed by TES-AR algorithm 320 to provide 600×1200 dpi output data. In datapath 304 this output data is processed by DEPLETE algorithm 324 for 16 ng pens, whereas in datapath 306, it is processed by a series combination of Bitstrip algorithm 316 and DEPLETE algorithm 326 for 32 ng pens. In datapaths 308 and 314, TES-AR is bypassed by 600 dpi 2 bit MLP input image data (blocks 340 and 342), and the black central input pixel (denoted E5) is simply passed through to the next processing stage. In datapath 308, DEPLETE algorithm 324 is applied to provide 1200×600 dpi output data to 16 ng pens. Since datapath 314 transfers only 600 dpi input data to 600 dpi output data for 32 ng pens, no resolution expansion is needed, and only a depletion algorithm 322 is required. In datapaths 310 and 312, 1200×600 dpi input image data requires no resolution expansion. In datapath 310, black central input pixels D5–G5 (block 344) are passed through and processed by DEPLETE algorithm 324 for 16 ng pens, whereas in datapath 312, input pixels D5–G5 (block 344) are processed by Bitstrip algorithm 316 (or preferably by a parallel combination of multiple Bitstrip algorithms 346) in series with DEPLETE algorithm 326 to provide output data for 32 ng pens.

The algorithms described can be implemented in software, hardware, or firmware. In hardware implementations, the boolean logic operations are provided by appropriate configurations of conventional logic circuit elements, similar to those described in Lund (U.S. Pat. No. 5,650,858), cited above. These circuit elements can be discrete and/or integrated into logic microcircuits, typically ASIC microcircuits, including multiplexers and programmed logic arrays (PLAs). The algorithms described above are configured to expand and process image data on the fly, thereby optimizing speed and minimizing data storage requirements.

Figure 9:
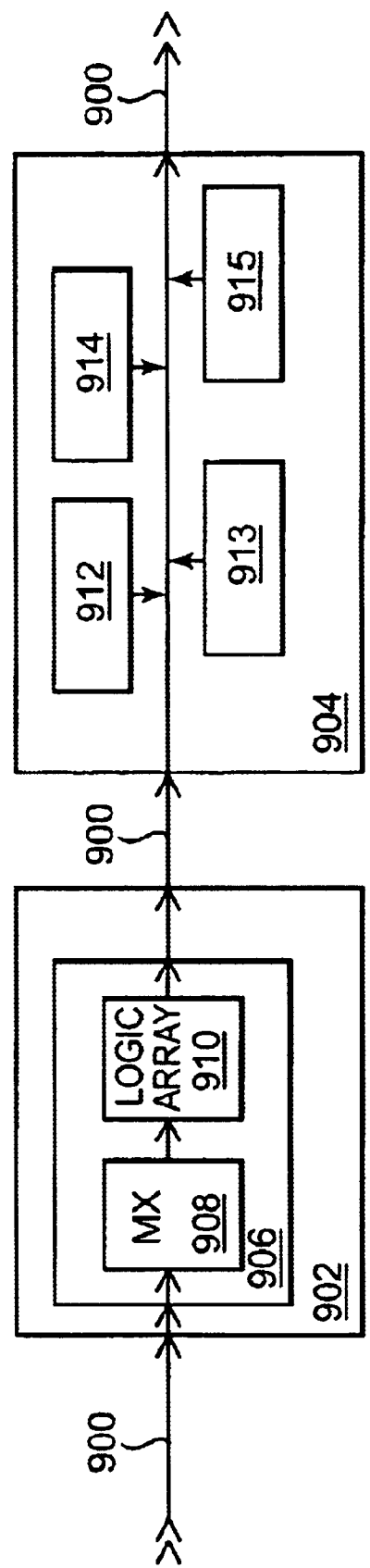
FIG. 9 is a block diagram illustrating a hardware implementation architecture, in accordance with an embodiment of the invention.

FIG. 9 is a block diagram illustrating a hardware implementation architecture, in accordance with an embodiment of the invention. Hardware processing modules 902 and 904 are connected in series to process image data in datapath 900 sequentially. Illustratively, hardware processing module 902 contains a logic circuit 906, which typically includes one or more multiplexers 908 and/or logic arrays 910, implemented in discrete or integrated circuit technology. Multiple parallel hardware modules accelerate system data throughput. For example, hardware processing module 904 contains multiple component processing modules 912–915 all operating in parallel synchronously on image data in datapath 900. Multiple component processing modules 912–915 can be identical or non-identical to one another. In some embodiments, multiple operations are performed concurrently in a single integrated process, as with the architecture illustrated in FIG. 9.

While embodiments of the present invention have been shown and described, changes and modifications to these illustrative embodiments can be made without departing from the present invention in its broader aspects. Thus it should be evident that there are other embodiments of this invention which, while not expressly described above, are within the scope of the present invention. Therefore, it will be understood that the appended claims necessarily encompass all such changes and modifications as fall within the described invention's true scope; and further that this scope is not limited merely to the illustrative embodiments presented to demonstrate that scope.

TABLE 1 tesarequ

```
.design_name Tesar
.inputnames  GreyInWindow DOTES KB2 KC2 KD2 KE2 KF2 KG2
KH2 KI2 KB3 KC3 KD3
.inputnames  KE3 KF3 KG3 KH3 KI3 KB4 KC4 KD4 KE4 KF4 KG4
KH4 KI4 KB5 KC5 KD5
.inputnames  KE5 KF5 KG5 KH5 KI5 KB6 KC6 KD6 KE6 KF6 KG6
KH6 KI6 KB7 KC7 KD7
.inputnames KE7 KF7 KG7 KH7 KI7
.outputnames TESAR7 TESAR6 TESAR5 TESAR4 TESAR3 TESAR2
TESAR1 TESAR0
TESAR7 = ((n466' + KD5') * (n467' + n439));
TESAR0 = ((n479' + KG5') * (n480' + n350));
TESAR1 = ((n477' + KG5') * (n478' + n350));
TESAR6 = ((n468' + KD5') * (n469' + n439));
TESAR4 = ((n472' + KE5') * (n473' + n313));
TESAR3 = ((n474' + KF5') * (n475' + n369));
TESAR2 = ((n369' + n383') * (KF5' + n476));
TESAR5 = ((n470' + KE5') * (n471' + n313));
n294 = (n295' * KE3' * KD3');
n295 = (KD4' + n351');
```

TABLE 1-continued tesarequ

```
n296 = ((n297' + n298') * n294');
n297 = n444';
n298 = (n351' * KD4');
n299 = ((KB2' + n300') * (n301' + n302'));
n300 = n447';
n301 = ((n318' * n311') + n339' + n319');
n302 = KD3';
n303 = ((KF7' + KE6' + n304' + n305') *
    (n306' + n307' + KD7' + KD4'));
n304 = (KF6' * n447');
n305 = (KD3' * KD4');
n306 = n448';
n307 = (KE6' * KE4' * KE7');
n308 = ((KC7' + n309' + n310' + n311') *
    (KC4' + KD6' + n312' + n313'));
n309 = n445';
n310 = n295';
n311 = KD7';
n312 = ((KF5' * n303') + (n299' * n550'));
n313 = KE5';
n314 = ((n315' + KF4') * n316');
n315 = (n438 * KD3 * KE2);
n316 = ((n449' * n552') + n555');
n317 = ((n318' + n311' + n298') *
    (n302' + n319' + n310'));
n318 = KC7';
n319 = KC3';
n320 = (n321 * n322 * n318);
n321 = (KE7' + KD7');
n322 = KE3';
n323 = ((KD3' + KD7' + n324' + n325') *
    (n305' + n326' + KC6' + n327')
n324 = (KC4' * KC6');
n325 = (n347' * KC3' * KC7');
n326 = KB6';
n327 = (n452' * n454');
n328 = ((n324' + KB7' + n329') * (KD6' + n330' + KE4'));
n329 = (KD7' * n295');
n330 = ((KB5' * n323') + n584');
n331 = ((KC5' + n297' + n332') * (KC3' + n313' + KC2'));
n332 = (KF7' * KF4');
n333 = ((n302' + n334' + n335') * (n313' + n322' + n336'));
n334 = KF6';
n335 = n331';
n336 = n619';
n337 = ((n338' + n339' + KD7') * (KD4' + n340' + n341'));
n338 = (KE6' * KE5');
n339 = KE7';
n340 = KF3';
n341 = n617';
n342 = (n343' * n337' * n344');
n343 = (n334' + n453');
n344 = KE4';
n345 = (n346' * n333' * n347')
n346 = (KE6' + n344');
n347 = KD4';
n348 = (n347' * KD3' * KE7');
n349 = (n350' * n351' * n340');
n350 = KG5';
n351 = KD6';
n352 = '((n353' + KD4' + n354') * (n355' + n356' + KE4'))
n353 = n346';
n354 = ((n448' + n560') * KF7');
n355 = (n591' + ((KD6' * n507) + (KD6 * n504)));
n356 = KE6';
n357 = (n358' * KF3' * KD7');
n358 = (n339' * n372');
n359 = ((KG5' + n360' + n361') * (KE6' + n313' + n362'));
n360 = ((n444' * n346') + n592');
n361 = (KD4' * KF7' * KF3');
n362 = n621';
n363 = ((n315' + KD4') * n364');
n364 = ((n516' * KG6') + (n515' * n390'));
n365 = (n358' * KE3' * KG7');
n366 = ((KD5' + n367' + n368') * (KF6' + n369' + n370'));
n367 = n598';
n368 = (KE7' * KG4' * KE3');
```

TABLE 1-continued tesarequ

```
n369 = KF5';
n370 = n626';
n371 = ((n339' + n372' + n373') * (n322' + n340' + n374'));
n372 = KF7';
n373 = (n334' * KF4');
n374 = n461';
n375 = ((KH5' + n309' + n376') * (n377' + KF6' + n378'));
n376 = (n371' * KG3' * KG7');
n377 = n630';
n378 = (KF5' * KE5');
n379 = ((n380' + KF5' + n381') * (KG6' + n382' + KG5'));
n380 = (KG5' * KG6');
n381 = (n570 * n420 * KE5);
n382 = ((n375' * n420') + n604');
n383 = (n384' + n385');
n384 = n379';
n385 = (n451' * GreyInWindow');
n386 = ((n387' + n372' + n388') * (n389' + n390' + KG4'));
n387 = ((KE5' * n609') + n463');
n388 = (n405' * n422');
n389 = ((n344' * n574') + n608' + n607');
n390 = KG6';
n391 = ((n392' + KE5' + n393') * (KE3' + n350' + KE2'));
n392 = n462';
n393 = (KH7' * KH4');
n394 = ((KE5' + n395' + n396') * (n397' + n398' + n399'));
n395 = KG3';
n396 = (KF3' * KG6' * KF7');
n397 = KI5';
n398 = KH7';
n399 = (KG3 * KG6 * KG7 * n350);
n400 = ((KF7' + n401' + n380') * (n402' + n403' + KF4'));
n401 = KG7';
n402 = n394';
n403 = KH3';
n404 = ((n405' + n406' + n407') * (KF4' + n408' + n409'));
n405 = KH4';
n406 = KH6';
n407 = (n400' * n420');
n408 = n610';
n409 = n422';
n410 = ((KI5' + n392' + n411') * (KI2' + n350' + KI3'));
n411 = (KF4' * KH7');
n412 = ((n403' + n334' + n413')* (n350' + n395' + n414'));
n413 = n410';
n414 = n632';
n415 = ((KI5' + n398' + n416') * (n313' + n372' + n399'));
n416 = (KH3' * KG6' * KG3');
n417 = ((n380' + n401' + KH7') * (n418' + n340' + KH4'));
n418 = n415';
n419 = (n420' * n417' * n343');
n420 = KG4';
n421 = (n422' * n412' * n405');
n422 = (KG6' * n420');
n423 = (n424' * n356' * n339');
n424 = (n350' + n372' + n313');
n425 = (KC5 * n311 * n302 * n356);
n426 = (KG7' * n427' * n380);
n427 = n457';
n428 = (n429' * n322' * n339');
n429 = (n311' + n450' + n305');
n430 = (n431' * n432');
n431 = (KG3' + n340');
n432 = (n559' + n346 + n453 + n318);
n433 = (KG7' * KG4' * KG3' * n340' * KH5' * n372');
n434 = (n435' * n436');
n435 = (n464' + n406' + n369' + n340');
n436 = (KH7' * n373' + n562' + KD3');
n437 = (n438' * n307' * KF7' * n439');
n438 = n454';
n439 = KD5';
n440 = (KI3' * KE7' * n338' * n403);
n441 = (n442' * n443');
n442 = ((n462' * n339') + (n395' * KG7'));
n443 = ((n633' + n403') * (KI6' + KH3'));
n444 = (n339' + n311');
n445 = (n338' + n344');
n446 = KB5';
n447 = (KB3' + n319');
n448 = (KD3' + n322');
n449 = KC6';
n450 = KC5';
n451 = DoTES';
n452 = KB7';
n453 = KF4';
n454 = (KF3' + n322');
n455 = (KE4' + n322');
n456 = KF2';
n457 = (KC3' + n302');
n458 = KD2';
n459 = KG2';
n460 = (n401' * KG3');
n461 = (KF4' + n334');
n462 = (n401' + n372');
n463 = (KH3' + n395');
n464 = KH5';
n465 = (n456' * n322' * n431');
n466 = n467';
n467 = (n385' + ((KC5' * n484) + (KC5 * n482)));
n468 = n469';
n469 = (n385' + ((KC5' * n492) + (KC5 * n490)));
n470 = n471';
n471 = (n385' + ((KF5' * n501) + (KF5 * n502)));
n472 = n473';
n473 = (n385' + ((KD5' * n508) + (KD5 * n510)))
n474 = n475';
n475 = (n385' + ((KG5' * n519) + (KG5 * n517)))
n476 = n383';
n477 = n478';
n478 = (n385' + ((KH5' * n537) + (KH5 * n538)))
n479 = n480';
n480 = (n385' + ((KF5' * n542) + (KF5 * n543)));
n481 = (KB4' + KB5');
n482 = (KC6' * n483');
n483 = ((KD5' * n308') + n580')
n484 = (KD5' + KE5' + n324' + n485');
n485 = (((n547' + n576') * n295') + n579');
n486 = ((n321' + n487') * n318');
n487 = (n311' + n319' + KC4');
n488 = ((n486' + n322') * (n334' + KE3'));
n489 = (KF5' + KF4');
n490 = (n309' + n491' + KD5');
n491 = ((n314' * n295') + n582');
n492 = (KE6' + n493' + KE5');
n493 = ((KD5' * n328') + n585')
n494 = ((n321' + n495') * n372');
n495 = (n339' + n340' + KF4');
n496 = (KC4 * KD3);
n497 = (n498' + ((KD3' * n494) + (KD3 * n449)));
n498 = (((KG7' + n372') * KE3') + n339');
n499 = ((n497' + n450') * (n496' + KC5'));
n500 = (n302' * n390');
n501 = ((n342' + n345') + KD6' + KD5');
n502 = (n351' + n439' + n347' + n503');
n503 = ((n556' + n557') * n313');
n504 = ((n505' + n506') * KG5');
n505 = ((KC7' + n297') * (KE3' + n339'));
n506 = n624';
n507 = (n449' * n340');
n508 = (n334 + n369 + n509);
n509 = ((n622' + n351') * (n430' + KD6'));
n510 = (n313 + n343 + KF5 +n352);
n511 = (KG7' * n358);
n512 = (n347' * n322');
n513 = (n514' + ((KE3' * n511) + (KF3 * n351)));
n514 = (((KH7' * n401') * n563') + n372');
n515 = ((n513' + n439') * (n512' + KD5'));
n516 = (KE3' + KH6');
n517 = (n309' + n518' + KF5');
n518 = (n363' * n461') + n596');
n519 = (n313 + n356 + n520);
n520 = ((n627' + n390') * (n434' + KG6'));
n521 = (KG3' * n455');
n522 = (KH5' + KH4');
```

TABLE 1-continued tesarequ

```
n523 = (n524' * KG3' * KE7');
n524 = n533';
n525 = (n526' + KD7' + n351' + n439');
n526 = n463';
n527 = ((n523' + n356') * (n525' + KE6'));
n528 = (n524' * KF3' * KH7');
n529 = (KI7' + KE3' + n530');
n530 = (KI6' * KF3' * KI5');
n531 = ((n528' + n406') * (n529' + KH6'));
n532 = (n533' + n534') * n398')
n533 = (KG7' + KF7');
n534 = (n401' + n403' + KH4');
n535 = (KE5' + KE4');
n536 = KI6';
n537 = (n404 + n369 + n334);
n538 = (n343 + n350 + KF5 + n386);
n539 = (KF4' + n340');
n540 = (KI4 * KI3 * KH2 * KG3);
n541 = (KF6' * n356')
n542 = ((n419' * n421') + KH6' + KH5');
n543 = (n405' + n406' + n464' + n544');
n544 = ((n572' + n573') * n350');
n545 = (KI4' + KH3');
n546 = (n447' * n302');
n547 = ((KC2' + KB4' + n546') * (n548' + n446' + KE6'));
n548 = ((n444' * n372') + (KD7' * n302') + n575');
n549 = (n296' * KC3' * KC7');
n550 = (n347' + n356');
n551 = (KE7' * n317');
n552 = (((n553' + n311') * n554') + n369');
n553 = ((KC7' * n452') + n302');
n554 = n488';
n555 = (KE3' + ((KC6' * n326) + (KC6 * n489)));
n556 = (n587' + n356' + KE4');
n557 = (n353' + KF4' + n590' + n311');
n558 = (KD4' + KE7');
n559 = (n313' + n449' + n450' + n322');
n560 = (n589 + KG5);
n561 = (KF5' * KG4' * KF7')
n562 = n455';
n563 = (n564' + n340');
n564 = (KG4' + n322' + n460');
n565 = (n340' + n459');
n566 = ((n358' + n460') * (n567' + n372'));
n567 = (n340' + ((KE7' * KD7) + (KE7 * n521)));
n568 = ((KH4' * n526' + n565') * (n569' + n464' + KE6'));
n569 = ((KH6' * n395') + n566');
n570 = (((n568' + n600') * n461') + n602');
n571 = (n445' * KF7' * KF5');
n572 = (n612' + n390' + KG4');
n573 = (n409' + KF4' + n614' + n398');
n574 = n465';
n575 = n616';
n576 = (KC3' + ((KE6' * n334) + (KE6 * n481)));
n577 = ((KE3' * KC3') * (n302' + KD7'));
n578 = ((KD3' * n322') + (KB5' * n577'))
n579 = (KE4' + n298' + n578' + n318');
n580 = (KB5' + n309' + KC4' + n549');
n581 = ((KF5' * n577') + n457');
n582 = (KC4' + n298' + n581' + n339');
n583 = ((KD3' * n320') + (n454' * n456'))
n584 = (n347' + n449' + n583');
n585 = (n562' + KF5' + n551' + n324');
n586 = (KD2' + n427' + KE3' + KC4');
n587 = (n586' + ((KF6' * n500) + (KF6 * n588)))
n588 = n499';
n589 = ((KD3' + KF3') * (n322' + KE7'));
n590 = ((KCS' * n589') + n454');
n591 = ((n349' * n465') + KG4');
n592 = (n302' + n356' + n562');
n593 = (KE4' + KF7' + n558' + n338');
n594 = ((n340' + KF7') * (KE3' + KG3'));
n595 = ((KD5' * n594') + n431');
n596 = (n373' + KG4' + n595' + n339');
n597 = (KG3' * KF3' * n461');
n598 = ((n373' + n392') * n597');
n599 = (n374' + KE7' + n561');
n600 = (KG3' + ((KE6' * n351) + (KE6 * n522)));
n601 = ((KF3' * n322') +(KH5' * n594'));
n602 = (n373' + KE4' + n601' + n401');
n603 = (n526' + n356' + KH2');
n604 = (n374' + KG7' + n571');
n605 = (((KI7' + n398') * KG3') + n401');
n606 = (n605' + ((KF3' * n532) + (KF3 * n356)));
n607 = (n606' + n313' + KH6')
n608 = (KF3' + ((KH6' * n536) + (KH6 * n535)));
n609 = ((KF3' + KH3') * n460');
n610 = ((n531' + n395' + n350') *
       (n611' + n340' + n406'));
n611 = n391';
n612 = (n613' + ((KH3' * n540) + (KH3 * n541)));
n613 = (KF6' + ((KI5' * n441) + (KI5 * n545)));
n614 = ((KG3' * n340') + (KI5' * n609'));
n615 = (KE7' + ((KD7' * n455) + (KD7 * n318)));
n616 = ((n615' + n319') * (KB6' + KC3'));
n617 = ((n425' + n322') * (n423' + KE3'));
n618 = (n302' + n372' + n321');
n619 = ((n618' + n334') * (n426' + KF6'));
n620 = ((KE3' * n357') + (n431' * n459'));
n621 = ((n620' + n344') * (n428' + KE4'));
n622 = ((n359' * n453') + n593');
n623 = ((n348' * n358') + KD7');
n624 = ((n623' + n340') * (KG6' + KF3'));
n625 = ((KF3' * n365') + (n448' * n458'));
n626 = ((n625' + n453') * (n433' + KF4'));
n627 = ((n366' * n344') + n599');
n628 = ((KF3' * n629') + n603');
n629 = n527';
n630 = ((n628' + n453') * (n437' + KF4'));
n631 = ((n401' * n398') + n403' + n372');
n632 = ((n631' + n334') * (n440' + KF6'));
n633 = (KF7' + ((KG7' * n539) + (KG7 * n398)));
```

TABLE 2

```
// BitStripping is only valid for binary data, so the flag
// 'GreyInWindow' will always be FALSE for valid data
wire StrpI7, StrpI6, StrpI5, StrpI4, StrpI3, StrpI2, StrpI1, StrpI0;
assign StrpI7 = (Res12x6 & KB5) | (Res600 & TESAR7);
assign StrpI6 = (Res12x6 & KC5) | (Res600 & TESAR6);
assign StrpI5 = (Res12x6 & KD5) | (Res600 & TESAR5);
assign StrpI4 = (Res12x6 & KE5) | (Res600 & TESAR4);
assign StrpI3 = (Res12x6 & KF5) | (Res600 & TESAR3);
assign StrpI2 = (Res12x6 & KG5) | (Res600 & TESAR2);
assign StrpI1 = (Res12x6 & KH5) | (Res600 & TESAR1);
assign StrpI0 = (Res12x6 & KI5) | (Res600 & TESAR0);
// Outputs from the bitstripping block
wire Strip3, Strip2, Strip1, Strip0;
assign
Strip3 = (~StrpI7 & ~StrpI6 & StrpI5 & ~StrpI4 & ~StrpI3 & ~StrpI2) |   // 8
         (~StrpI7 & ~StrpI6 & StrpI5 & ~StrpI4 & ~StrpI3 & StrpI2) |    // 9
         (~StrpI7 & ~StrpI6 & StrpI5 & ~StrpI4 & StrpI3 & ~StrpI2) |    // 10
         (~StrpI7 & ~StrpI6 & StrpI5 & ~StrpI4 & StrpI3 & StrpI2) |     // 11
         (~StrpI7 & ~StrpI6 & StrpI5 & StrpI4 & StrpI3 & ~StrpI2) |     // 12
         (~StrpI7 & ~StrpI6 & StrpI5 & StrpI4 & ~StrpI3 & StrpI2) |     // 13
         (~StrpI7 & ~StrpI6 & StrpI5 & StrpI4 & StrpI3 & ~StrpI2) |     // 14
         (~StrpI7 & ~StrpI6 & StrpI5 & StrpI4 & StrpI3 & StrpI2) |      // 15
         (StrpI7 & ~StrpI6 & StrpI5 & ~StrpI4 & ~StrpI3 & ~StrpI2) |    // 40
         (StrpI7 & ~StrpI6 & StrpI5 & ~StrpI4 & ~StrpI3 & StrpI2) |     // 41
         (StrpI7 & ~StrpI6 & StrpI5 & ~StrpI4 & StrpI3 & ~StrpI2) |     // 42
         (StrpI7 & ~StrpI6 & StrpI5 & ~StrpI4 & StrpI3 & StrpI2) |      // 43
         (StrpI7 & ~StrpI6 & StrpI5 & StrpI4 & ~StrpI3 & ~StrpI2) |     // 44
         (StrpI7 & ~StrpI6 & StrpI5 & StrpI4 & ~StrpI3 & StrpI2) |      // 45
         (StrpI7 & ~StrpI6 & StrpI5 & StrpI4 & StrpI3 & ~StrpI2) |      // 46
         (StrpI7 & ~StrpI6 & StrpI5 & StrpI4 & StrpI3 & StrpI2 ) |      // 47
         (StrpI7 & StrpI6 & StrpI5 & StrpI4 & ~StrpI3 & ~StrpI2) |      // 60
         (StrpI7 & StrpI6 & StrpI5 & StrpI4 & ~StrpI3 & StrpI2 ) |      // 61
         (StrpI7 & StrpI6 & StrpI5 & StrpI4 & StrpI3 & StrpI2) |        // 63
         (~StrpI7 & StrpI6 & StrpIs & StrpI4 & StrpI3 & StrpI2 &
          MoreOnLeft) |                                                  // 31
```

TABLE 2-continued

```
        (~StrpI7 & StrpI6 & StrpI5 & StrpI4 & ~StrpI3 & ~StrpI2 &
            MoreOnRight) | // 28
        (~StrpI7 & StrpI6 & StrpI5 & StrpI4 & ~StrpI3 & StrpI2 &
            MoreOnRight) | // 29
        (StrpI7 & StrpI6 & StrpI5 & StrpI4 & StrpI3 & ~StrpI2 &
            MoreOnRight); | // 62
assign
Strip2 = (~StrpI7 & ~StrpI6 & ~StrpI5 & StrpI4 & ~StrpI3 & ~StrpI2) |
    // 4
    (~StrpI7 & ~StrpI6 & ~StrpI5 & StrpI4 & ~StrpI3 & StrpI2) | // 5
    (~StrpI7 & ~StrpI6 & ~StrpI5 & StrpI4 & StrpI3 & ~StrpI2) | // 6
    (~StrpI7 & ~StrpI6 & ~StrpI5 & StrpI4 & StrpI3 & StrpI2) | // 7
    (~StrpI7 & StrpI6 & ~StrpI5 & StrpI4 & ~StrpI3 & ~StrpI2) | // 20
    (~StrpI7 & StrpI6 & ~StrpI5 & StrpI4 & ~StrpI3 & StrpI2) | // 21
    (~StrpI7 & StrpI6 & ~StrpI5 & StrpI4 & StrpI3 & ~StrpI2) | // 22
    (~StrpI7 & StrpI6 & ~StrpI5 & StrpI4 & StrpI3 & StrpI2) | // 23
    (~StrpI7 & StrpI6 & StrpI5 & StrpI4 & StrpI3 & ~StrpI2) | // 30
    (StrpI7 & ~StrpI6 & ~StrpI5 & StrpI4 & ~StrpI3 & ~StrpI2) | // 36
    (StrpI7 & ~StrpI6 & ~StrpI5 & StrpI4 & ~StrpI3 & StrpI2) | // 37
    (StrpI7 & ~StrpI6 & ~StrpI5 & StrpI4 & StrpI3 & ~StrpI2) | // 38
    (StrpI7 & ~StrpI6 & ~StrpI5 & StrpI4 & StrpI3 & StrpI2) | // 39
    (StrpI7 & StrpI6 & ~StrpI5 & StrpI4 & ~StrpI3 & ~StrpI2) | // 52
    (StrpI7 & StrpI6 & ~StrpI5 & StrpI4 & ~StrpI3 & StrpI2) // 53
    (StrpI7 & StrpI6 & ~StrpI5 & StrpI4 & StrpI3 & ~StrpI2) | // 54
    (StrpI7 & StrpI6 & ~StrpI5 & StrpI4 & StrpI3 & StrpI2) | // 55
    (StrpI7 & StrpI6 & StrpI5 & StrpI4 & StrpI3 & ~StrpI2) | // 62
    (~StrpI7 & ~StrpI6 & StrpI5 & StrpI4 & StrpI3 & ~StrpI2 &
        MoreOnLeft) | // 14
    (StrpI7 & ~StrpI6 & StrpI5 & StrpI4 & StrpI3 & ~StrpI2 &
        MoreOnLeft); // 46
assign
Strip1 = (~StrpI5 & ~StrpI4 & StrpI3 & ~StrpI2 & ~StrpI1 & ~StrpI0) |
    // 8
    (~StrpI5 & ~StrpI4 & StrpI3 & ~StrpI2 & ~StrpI1 & StrpI0) | // 9
    (~StrpI5 & ~StrpI4 & StrpI3 & ~StrpI2 & StrpI1 & ~StrpI0) | // 10
    (~StrpI5 & ~StrpI4 & StrpI3 & ~StrpI2 & StrpI1 & StrpI0) | // 11
    (~StrpI5 & ~StrpI4 & StrpI3 & StrpI2 & ~StrpI1 & ~StrpI0) | // 12
    (~StrpI5 & ~StrpI4 & StrpI3 & StrpI2 & ~StrpI1 & StrpI0) | // 13
    (~StrpI5 & ~StrpI4 & StrpI3 & StrpI2 & StrpI1 & ~StrpI0) | // 14
    (~StrpI5 & ~StrpI4 & StrpI3 & StrpI2 & StrpI1 & StrpI0) | // 15
    (StrpI5 & ~StrpI4 & StrpI3 & ~StrpI2 & ~StrpI1 & ~StrpI0) | // 40
    (StrpI5 & ~StrpI4 & StrpI3 & ~StrpI2 & ~StrpI1 & StrpI0) | // 41
    (StrpI5 & ~StrpI4 & StrpI3 & ~StrpI2 & StrpI1 & ~StrpI0) | // 42
    (StrpI5 & ~StrpI4 & StrpI3 & ~StrpI2 & StrpI1 & StrpI0) | // 43
    (StrpI5 & ~StrpI4 & StrpI3 & StrpI2 & ~StrpI1 & ~StrpI0) | // 44
    (StrpI5 & ~StrpI4 & StrpI3 & StrpI2 & ~StrpI1 & StrpI0) | // 45
    (StrpI5 & ~StrpI4 & StrpI3 & StrpI2 & StrpI1 & ~StrpI0) | // 46
    (StrpI5 & ~StrpI4 & StrpI3 & StrpI2 & StrpI1 & StrpI0) | // 47
    (StrpI5 & StrpI4 & StrpI3 & StrpI2 & ~StrpI1 & ~StrpI0) | // 60
    (StrpI5 & StrpI4 & StrpI3 & StrpI2 & ~StrpI1 & StrpI0) | // 61
    (StrpI5 & StrpI4 & StrpI3 & StrpI2 & StrpI1 & StrpI0) | // 63
    (~StrpI5 & StrpI4 & StrpI3 & StrpI2 & StrpI1 & StrpI0 &
        MoreOnLeft) | // 31
    (~StrpI5 & StrpI4 & StrpI3 & StrpI2 & ~StrpI1 & StrpI0 &
        MoreOnRight) | // 28
    (~StrpI5 & StrpI4 & StrpI3 & StrpI2 & StrpI1 & StrpI0 &
        MoreOnRight) | // 29
    (StrpI5 & StrpI4 & StrpI3 & StrpI2 & StrpI1 & ~StrpI0 &
        MoreonRight); // 62
assign
Strip0 = (~StrpI5 & ~StrpI4 & ~StrpI3 & StrpI2 & ~StrpI1 & ~StrpI0) |
    // 4
    (~StrpI5 & ~StrpI4 & ~StrpI3 & StrpI2 & ~StrpI1 & StrpI0) | // 5
    (~StrpI5 & ~StrpI4 & ~StrpI3 & StrpI2 & StrpI1 & ~StrpI0) | // 6
    (~StrpI5 & ~StrpI4 & ~StrpI3 & StrpI2 & StrpI1 & StrpI0) | // 7
    (~StrpI5 & StrpI4 & ~StrpI3 & StrpI2 & ~StrpI1 & ~StrpI0) | // 20
    (~StrpI5 & StrpI4 & ~StrpI3 & StrpI2 & ~StrpI1 & StrpI0) | // 21
    (~StrpI5 & StrpI4 & ~StrpI3 & StrpI2 & StrpI1 & ~StrpI0) | // 22
    (~StrpI5 & StrpI4 & ~StrpI3 & StrpI2 & StrpI1 & StrpI0) | // 23
    (~StrpI5 & StrpI4 & StrpI3 & StrpI2 & StrpI1 & ~StrpI0) | // 30
    (StrpI5 & ~StrpI4 & ~StrpI3 & StrpI2 & ~StrpI1 & ~StrpI0) | // 36
    (StrpI5 & ~StrpI4 & ~StrpI3 & StrpI2 & ~StrpI1 & StrpI0) | // 37
    (StrpI5 & ~StrpI4 & ~StrpI3 & StrpI2 & StrpI1 & ~StrpI0) | // 38
    (StrpI5 & ~StrpI4 & ~StrpI3 & StrpI2 & StrpI1 & StrpI0) | // 39
    (StrpI5 & StrpI4 & ~StrpI3 & StrpI2 & ~StrpI1 & ~StrpI0) | // 52
    (StrpI5 & StrpI4 & ~StrpI3 & StrpI2 & ~StrpI1 & StrpI0) | // 53
    (StrpI5 & StrpI4 & ~StrpI3 & StrpI2 & StrpI1 & ~StrpI0) | // 54
    (StrpI5 & StrpI4 & ~StrpI3 & StrpI2 & StrpI1 & StrpI0) | // 55
    (StrpI5 & StrpI4 & StrpI3 & StrpI2 & StrpI1 & ~StrpI0) | // 62
```

```
    (~StrpI5 & ~StrpI4 & StrpI3 & StrpI2 & StrpI1 & ~StrpI0 &
        MoreOnLeft) | // 14
    (StrpI5 & ~StrpI4 & StrpI3 & StrpI2 & StrpI1 & ~StrpI0 &
        MoreOnLeft); // 46
```

TABLE 3

```
wire OutputWidth4, OutputHeight2;
assign OutputWidth4 = (Res600 & DoTES) | (Res600 & Ng16) |
    Res12x6;
// OutputWidth2 = (Res300) | (Res600 & ~DoTES & ~Ng16);
assign OutputHeight2 = Res300;
assign DepletionStepRate4 = (Res600 & Ng16) | (Res12x6 & Ng16);
// Depletion will be enabled if the current bit is surrounded to the top,
// bottom, right and left. Bit E5 is the center of 300 dpi, and E5 and F5
// are the centers for 600 dpi. Depletion will only be enabled if these
// bits are at their highest HiFIPE Level, which will be encoded as a '1'
// in the window array.
wire DepEn3x3;         // for 300 dpi input data
wire DepEn6x6Left, DepEn6x6Right; // for 600 dpi input data
wire DepEn12x6_D5E5, DepEn12x6_F5G5;
// for any 1200 dpi data to 32ng pens
wire DepEn12x6_D5, DepEn12x6_E5, // for native 1200 dpi.
    DepEn12x6_F5, DepEn12x6_G5;
assign DepEn3x3 = KE4 & KD5 & KE5 & KF5 & KE6;
assign DepEn6x6Left = KE4 & KD5 & KE5 & KF5 & KE6;
assign DepEn6x6Right = KF4 & KE5 & KF5 & KG5 & KF6;
assign DepEn12x6_D5 = KD4 & KC5 & KD5 & KE5 & KD6;
assign DepEn12x6_E5 = KE4 & KD5 & KE5 & KF5 & KE6;
assign DepEn12x6_F5 = KF4 & KE5 & KF5 & KG5 & KF6;
assign DepEn12x6_G5 = KG4 & KF5 & KG5 & KH5 & KG6;
assign DepEn12x6_D5E5 = (KD4 | KE4)&
    (KB5 | KC5)&(KD5 | KE5)&(KF5 | KG5)&
    (KD6 | KE6);
assign DepEn12x6_F5G5 = (KF4 | KG4)&
    (KD5 | KE5)&(KF5 | KG5)&(KH5 | KI5)&
    (KF6 | KG6);
```

What is claimed is:

1. An input pixel data processing method, wherein each pixel has associated therewith a pixel density and wherein the input pixel data may have associated therewith a gray scale of such pixel densities, the method comprising:

generating an output pixel;

depleting the pixel density of a selected output pixel in a plane containing a plurality of output pixels, including adjusting a drop weight of said selected output pixel, wherein said selected output pixel is selected by performing logic operations on at least said selected output pixel, said logic operations embodying selection criteria, such selection criteria including:

alignment of said selected output pixel with a preselected position in a two-dimensional depletion array tiled logically across said plane; and said selected output pixel and four output pixels immediately adjacent said selected output pixel having a preselected pixel density.

2. The method of claim 1, wherein the preselected pixel density is dark.

3. The method of claim 1, wherein said method is applied in parallel cooperatively to a plurality of said output pixels.

4. The method of claim 1, wherein the pixel density of said selected output pixel is depleted by reducing the gray scale density level of said selected output pixel.

5. The method of claim 1, wherein the resolution of said selected output pixel is measured by 600 pixels per inch in a first direction and 1200 pixels per inch in a second direction.

6. The method of claim 1, wherein said selected output pixel and four output pixels immediately adjacent said selected output pixel are all contained within a corresponding selected input pixel and three input pixels immediately adjacent said selected input pixel.

7. The method of claim 1, further comprising reducing by pixel thinning the average pixel density of an output pixel image, wherein such output pixel image otherwise delivers excess average pixel density, such pixel thinning including:
   scanning a first row of given pixels of said output pixel image along a given direction;
   determining if said first row of given pixels contains a series of adjacent pixels having dark pixel density; if so, then
   turning off alternate dark density pixels in said series, such that the resulting pixel density of said series is reduced on average by approximately one-half;
   scanning a second row of given pixels adjacent said first row of given pixels along said given direction; and
   selectively turning on pixels within and proximate to an end point of said series, thereby preserving edge definition and filling preselected interior spaces within dark pixel density images.

8. The method of claim 7, wherein said edge definition is preserved at a resolution of 1200 pixels per inch when outputting at a resolution of 600 pixels per inch from 1200 pixel per inch input pixel data.

9. The method of claim 1, further comprising resolution expansion and edge smoothing of said input pixel data prior to said depleting, said resolution expansion and edge smoothing including:
   selecting a given pixel of the input pixel data and defining a window that includes the given pixel and a set of immediately neighboring pixels;
   determining whether any pixel within the window has associated therewith a gray scale; if so, then
   expanding the lower resolution of the given pixel within the defined window to produce a gray scaled output pixel image at a first resolution; if not, then
   mapping the given pixel into a predefined plural-pixel of said first resolution, wherein said mapping is performed by performing logic operations on pixels within said window; and
   substituting for the given pixel the predefined plural-pixel of said first resolution based on said logic operations, thereby producing an output plural pixel image of said first resolution which smoothes jagged edges while preserving the gray scale of the input pixel data.

10. The method of claim 9, wherein said method is applied in parallel cooperatively to a plurality of given pixels.

11. The method of claim 1, wherein said method is applied to input data in an inkjet printer.

12. An input pixel data processing method, wherein each pixel has associated therewith a pixel density and wherein the input pixel data may have associated therewith a gray scale of such pixel densities, the method comprising:
   generating an output pixel image in response to said input pixel data;
   reducing by pixel thinning the average pixel density of said output pixel image, wherein such output pixel image otherwise delivers excess average pixel density, such pixel thinning comprising:
      scanning a first row of given pixels of said output pixel image along a given direction;
      determining if said first row of given pixels contains a series of adjacent pixels having dark pixel density; if so, then
      turning off alternate dark density pixels in said series, such that the resulting pixel density of said series is reduced on average by approximately one-half;
      scanning a second row of given pixels adjacent said first row of given pixels along said given direction; and
      selectively turning on pixels within and proximate to an end point of said series, thereby preserving edge definition and filling preselected interior spaces within dark pixel density images.

13. The method of claim 12, further comprising resolution expansion and edge smoothing of said input pixel data prior to said pixel thinning, said resolution expansion and edge smoothing including:
   selecting a given pixel of the input pixel data and defining a window that includes the given pixel and a set of immediately neighboring pixels;
   determining whether any pixel within the window has associated therewith a gray scale; if so, then
   expanding the lower resolution of the given pixel within the defined window to produce a gray scaled output pixel image at a first resolution; if not, then
   mapping the given pixel into a predefined plural-pixel of said first resolution, wherein said mapping is performed by performing logic operations on pixels within said window; and
   substituting for the given pixel the predefined plural-pixel of said first resolution based on said logic operations, thereby producing an output plural pixel image of said first resolution which smoothes jagged edges while preserving the gray scale of the input pixel data.

14. The method of claim 12, wherein said method is applied in parallel cooperatively to a plurality of given pixels.

15. The method of claim 12, wherein said edge definition is preserved at a resolution of 1200 pixels per inch when outputting a density of 600 pixels per inch from 1200 pixel per inch input pixel data.

16. The method of claim 12, wherein said method is applied to input data in an inkjet printer.

17. An input pixel data processing method, wherein each pixel has associated therewith a pixel density, the method comprising:
   generating an output pixel image based on the input pixel data;
   depleting the pixel density of a selected output pixel of the output pixel image, including adjusting a drop weight of the selected output pixel; and
   reducing by pixel thinning an average pixel density of the output pixel image, including selectively turning off pixels of the output pixel image.

18. The method of claim 17, further comprising selecting the selected output pixel based on selection criteria including:
   alignment of the selected output pixel with a preselected position in a two-dimensional array; and
   the selected output pixel and four output pixels immediately adjacent the selected output pixel having a preselected pixel density.

19. The method of claim 18, wherein the preselected pixel density is a dark pixel density.

20. The method of claim 17, wherein the input pixel data has associated therewith a gray scale of pixel densities, and wherein depleting the pixel density includes reducing the gray scale density level of the selected output pixel.

21. An input pixel data processing method, wherein each pixel has associated therewith a pixel density, the method comprising:

generating an output pixel image based on the input pixel data;

depleting the pixel density of a selected output pixel of the output pixel image; and reducing by pixel thinning an average pixel density of the output pixel image, wherein pixel thinning includes:

scanning a first row of pixels of the output pixel image along a given direction;

determining if the first row of pixels contains a series of adjacent pixels having dark pixel density; if so, then turning off alternate dark density pixels in the series;

scanning a second row of pixels adjacent the first row of pixels along the given direction; and selectively turning on pixels within and proximate to an end point of the series.

22. The method of claim 21, further comprising resolution expansion of the input pixel data prior to depleting the pixel density, wherein resolution expansion includes:

selecting a given pixel of the input pixel data and defining a window that includes the given pixel and a set of immediately neighboring pixels;

determining whether any pixel within the window has associated therewith a gray scale; if so, then expanding the resolution of the given pixel within the defined window to produce a gray scaled output pixel image at an expanded resolution; if not, then mapping the given pixel into a predefined plural-pixel of the expanded resolution, including performing logic operations on pixels within the window; and substituting for the given pixel the predefined plural-pixel of the expanded resolution based on the logic operations.

23. The method of claim 21, further comprising edge smoothing of the input pixel data prior to depleting the pixel density.

* * * * *